US012658094B2

(12) United States Patent
Li et al.

(10) Patent No.: US 12,658,094 B2
(45) Date of Patent: Jun. 16, 2026

(54) DRIVING METHOD AND DISPLAY DEVICE

(71) Applicants: Wuhan BOE Optoelectronics Technology Co., Ltd., Wuhan (CN); BOE TECHNOLOGY GROUP CO., LTD., Beijing (CN)

(72) Inventors: Yun Li, Beijing (CN); Lijun Xiao, Beijing (CN); Ning Zhu, Beijing (CN); Peng Jiang, Beijing (CN); Xiaoxiao Chen, Beijing (CN); Chao Wang, Beijing (CN); Yan Zhou, Beijing (CN); Tian Zhang, Beijing (CN)

(73) Assignees: Wuhan BOE Optoelectronics Technology Co., Ltd., Wuhan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/687,776

(22) PCT Filed: Aug. 31, 2022

(86) PCT No.: PCT/CN2022/116098

§ 371 (c)(1),
(2) Date: Feb. 28, 2024

(87) PCT Pub. No.: WO2024/045017

PCT Pub. Date: Mar. 7, 2024

(65) Prior Publication Data

US 2025/0140159 A1 May 1, 2025

(51) Int. Cl.

*G09G 3/20* (2006.01)
*G09G 3/32* (2016.01)
*G09G 3/36* (2006.01)

(52) U.S. Cl.

CPC ............. *G09G 3/2092* (2013.01); *G09G 3/20* (2013.01); *G09G 3/32* (2013.01); *G09G 3/36* (2013.01);

(Continued)

(58) Field of Classification Search

CPC ......... G09G 3/2092; G09G 2300/0426; G09G 2300/0842; G09G 2310/0267;

(Continued)

(56) References Cited

U.S. PATENT DOCUMENTS 5,510,805 A 4/1996 Lee
2006/0176264 A1* 8/2006 Go ...................... G09G 3/3677 345/100

(Continued)

FOREIGN PATENT DOCUMENTS

CN 101320552 A 12/2008
CN 103413532 A 11/2013

(Continued)

OTHER PUBLICATIONS

State Intellectual Property Office of the People's Republic of China, Office Action and Search Report Issued in Application No. 202280002955.3, Feb. 3, 2026, 10 pages. (Submitted with Partial Translation).

*Primary Examiner* — Adam J Snyder
(74) *Attorney, Agent, or Firm* — McCoy Russell LLP

(57) ABSTRACT

The present disclosure provides a driving method and a display device. The driving method is applied to a display panel, including a plurality of rows of scanning lines, a plurality of columns of data lines, and a plurality of rows and a plurality of columns of pixel circuits, the pixel circuits being respectively electrically connected to corresponding rows of scanning lines and corresponding columns of data lines. The driving method includes: controlling a first charg- (Continued)

ing time to be greater than 0.5 times a second charging time, and controlling the first charging time to be less than the second charging time; wherein the first charging time is a time for charging an Ath-row Mth-column pixel circuit via an Ath data voltage on the Mth-column data line; the second charging time is a time for charging the Bth-row Mth-column pixel circuit via the Ath data voltage and a Bth data voltage.

18 Claims, 9 Drawing Sheets

(52) U.S. Cl.
CPC ............... *G09G 2300/0426* (2013.01); *G09G 2300/0842* (2013.01); *G09G 2310/0267* (2013.01); *G09G 2310/08* (2013.01); *G09G 2320/0233* (2013.01)

(58) Field of Classification Search
CPC ....... G09G 2310/08; G09G 2320/0233; G09G 3/20; G09G 3/32; G09G 3/36
See application file for complete search history.

(56) References Cited

U.S. PATENT DOCUMENTS

| | | | | |
|---|---|---|---|---|
| 2007/0046609 | A1* | 3/2007 | Lee | G09G 3/3648 345/94 |
| 2009/0021509 | A1* | 1/2009 | Lee | G09G 3/3677 345/213 |
| 2009/0040161 | A1* | 2/2009 | Baek | G09G 3/3677 345/94 |
| 2014/0022225 | A1* | 1/2014 | Lee | G09G 3/3648 345/211 |
| 2014/0104256 | A1 | 4/2014 | Oohira | |
| 2016/0379546 | A1* | 12/2016 | Kim | G09G 3/2092 345/213 |
| 2018/0336957 | A1* | 11/2018 | Mi | G09G 3/20 |
| 2019/0132583 | A1* | 5/2019 | Li | G09G 3/3611 |

FOREIGN PATENT DOCUMENTS

| | | | |
|---|---|---|---|
| CN | 103985365 | A | 8/2014 |
| CN | 105761691 | A | 7/2016 |
| CN | 107068108 | A | 8/2017 |
| CN | 109584840 | A | 4/2019 |
| CN | 113223473 | A | 8/2021 |
| CN | 113362762 | A | 9/2021 |
| CN | 114093298 | A | 2/2022 |
| CN | 114141201 | A | 3/2022 |
| CN | 114187859 | A | 3/2022 |
| CN | 114863894 | A | 8/2022 |
| JP | 2002108288 | A | 4/2002 |
| KR | 20150061403 | A | 6/2015 |

* cited by examiner

DRIVING METHOD AND DISPLAY DEVICE

CROSS REFERENCE TO RELATED APPLICATIONS

This application is the U.S. national phase of PCT Application No. PCT/CN2022/116098 filed on Aug. 31, 2022, the disclosure of which is incorporated in its entirety by reference herein.

TECHNICAL FIELD

The present disclosure relates to the field of display technology, and more particularly, to a driving method and a display device.

BACKGROUND

The charging rate of related display products is low, which results in many patterns failing to display normally or displaying abnormally, especially when there is boundary unclear in chessboard pictures, H2 Line pictures and H3 Line pictures.

SUMMARY

In one aspect, an embodiment of the present invention provides a driving method applied to a display panel, the display panel including a plurality of rows of scanning lines, a plurality of columns of data lines, and a plurality of rows and a plurality of columns of pixel circuits, the pixel circuits being electrically connected to corresponding rows of scanning lines and corresponding columns of data lines; the driving method includes:

- controlling a first charging time to be greater than 0.5 times a second charging time, and controlling the first charging time to be less than the second charging time;
- wherein the first charging time is a time for charging an Ath-row Mth-column pixel circuit via an Ath data voltage on the Mth-column data line;
- the second charging time is a time for charging the Bth-row Mth-column pixel circuit via the Ath data voltage and a Bth data voltage on the Mth-column data line;
- A, B and M being positive integers.

Optionally, the Ath-row Mth-column pixel circuit is electrically connected to an Ath-row scanning line, and the Bth-row Mth-column pixel circuit is electrically connected to the Bth-row scanning line; the Ath-row scanning line is used for providing an Ath-row scanning signal, and the Bth-row scanning line is used for providing a Bth-row scanning signal;

- the driving method includes: controlling a time interval between a falling edge time of the Ath-row scanning signal and a falling edge time of the Bth-row scanning signal to be less than a half of the time for charging the Bth-row Mth-column pixel circuit via the Ath data voltage and the Bth data voltage.

Optionally, the Ath data voltage is the same as the Bth data voltage.

Optionally, an effective pulse width of the Ath-row scanning signal is the same as an effective pulse width of the Bth-row scanning signal.

Optionally, the effective pulse width of the Ath-row scanning signal is greater than the effective pulse width of the Bth-row scanning signal.

Optionally, in an Nth frame, the Ath-row Mth-column pixel circuit is an even-row pixel circuit, and the Bth-row Mth-column pixel circuit is an odd-row pixel circuit; N is an integer.

Optionally, in an (N+1) th frame, the Ath-row Mth-column pixel circuit is an odd-row pixel circuit, and the Bth-row Mth-column pixel circuit is an even-row pixel circuit; N is a positive integer.

Optionally, the Ath data voltage and the Bth data voltage are the same data voltage; the Ath-row Mth-column pixel circuit is electrically connected to an Ath-row scanning line, and the Bth-row Mth-column pixel circuit is electrically connected to a Bth-row scanning line; the Ath-row scanning line is used for providing an Ath-row scanning signal, and the Bth-row scanning line is used for providing a Bth-row scanning signal;

- the driving method further includes: controlling a first time to be greater than a second time;
- the first time is a time interval between a time when the Mth-column data line starts to provide the Ath data voltage and a falling edge time of the Ath-row scanning signal;
- the second time is a time interval between a falling edge time of the Ath-row scanning signal and a falling edge time of the Bth-row scanning signal.

Optionally, the Ath-row Mth-column pixel circuit is electrically connected to the Ath-row scanning line, and the Bth-row Mth-column pixel circuit is electrically connected to the Bth-row scanning line;

- the Ath-row scanning line is used for providing an Ath-row scanning signal, and the Bth-row scanning line is used for providing the Bth-row scanning signal;
- an effective pulse width of the Ath-row scanning signal is not equal to an effective pulse width of the Bth-row scanning signal.

In a second aspect, an embodiment of the present invention provides a driving method applied to a display panel, the display panel including a plurality of rows of scanning lines, a plurality of columns of data lines, and a plurality of rows and a plurality of columns of pixel circuits, the pixel circuits being respectively electrically connected to corresponding rows of scanning lines and corresponding columns of data lines. the driving method includes:

- when a fall time of an Ath-row scanning signal provided by an Ath-row scanning line is less than a fall time of a Bth-row scanning signal provided by a Bth-row scanning line, controlling a third time to be greater than a fourth time;
- the third time is a time interval between a time when an Mth-column data line starts to provide an Ath data voltage to an Ath-row Mth-column pixel circuit and a time when the potential of the Ath-row scanning signal starts to decrease;
- the fourth time is a time interval between a time when the Mth-column data line starts to provide a Bth data voltage to a Bth-row Mth-column pixel circuit and a time when the potential of the Bth-row scanning signal starts to decrease;
- A, B and M being positive integers, and A is not equal to B.

Optionally, the Ath data voltage is not equal to the Bth data voltage.

Optionally, a time interval between the time when the potential of the Ath-row scanning signal starts to decrease and a time when the Mth-column data line stops providing the Ath data voltage is greater than a time interval between the time when the potential of the Bth-row scanning signal starts to decrease and the time when the Mth-column data line stops providing the Bth data voltage.

Optionally, the driving method is applied to a display panel, and the display panel includes a first gate driving circuit and a second gate driving circuit;

the first gate driving circuit and the second gate driving circuit share a pull-up node; the first gate driving circuit and the second gate driving circuit both access a first clock signal end providing a first clock signal and a second clock signal end providing a second clock signal;

when the potential of the first clock signal jumps from a first level to a second level, the potential of the pull-up node is a first voltage value, and when the potential of the second clock signal jumps from the first level to the second level, the potential of the pull-up node is a second voltage value; the first voltage value is not equal to the second voltage value;

when the potential of the first clock signal jumps from a high level to a low level, the potential of the pull-up node becomes a third voltage value, and when the potential of the second clock signal jumps from a high level to a low level, the potential of the pull-up node is a fourth voltage value; the third voltage value is not equal to the fourth voltage value.

In a third aspect, an embodiment of the present invention provides a driving method applied to a display panel, the display panel including a plurality of rows of scanning lines, a plurality of columns of data lines, and a plurality of rows and a plurality of columns of pixel circuits, the pixel circuits being respectively electrically connected to corresponding rows of scanning lines and corresponding columns of data lines.

when an Ath data voltage provided by an Mth-column data line is different from a Bth data voltage provided by the Mth-column data line, controlling a time for charging a Bth-row Mth-column pixel circuit via the Bth data voltage to be greater than a charging time threshold;

A, B, and M being positive integers, and A is not equal to B.

Optionally, the charging time threshold is a one-row scanning time.

Optionally, the Ath-row Mth-column pixel circuit is electrically connected to an Ath-row scanning line, and the Bth-row Mth-column pixel circuit is electrically connected to the Bth-row scanning line; the Ath-row scanning line is used for providing an Ath-row scanning signal, and the Bth-row scanning line is used for providing a Bth-row scanning signal;

an effective pulse width of the Ath-row scanning signal is less than an effective pulse width of the Bth-row scanning signal.

Optionally, the step of controlling a time for charging a Bth-row Mth-column pixel circuit via the Bth data voltage to be greater than a charging time threshold, includes:

increasing a time interval between a falling edge time of the Ath-row scanning signal and a falling edge time of the Bth-row scanning signal, so as to control the time for charging the Bth-row Mth-column pixel circuit via the Bth data voltage to be greater than a charging time threshold.

In a fourth aspect, an embodiment of the invention provides a display device including a display panel, a timing controller, and a driving module;

the timing controller includes a storage unit and a comparison unit;

the storage unit stores a specific picture;

the comparison unit is used for comparing a picture to be displayed with a specific picture, and when the picture to be displayed and the specific picture are the same or partially the same, providing an indication signal to the driving module;

the driving module is used for invoking the driving method as described above when receiving the indication signal.

Optionally, the display device according to at least one embodiment of the present invention further includes a display control circuit; the timing controller is used for providing a first input clock signal and a second input clock signal for the display control circuit;

the display control circuit is used for providing and outputting a plurality of output clock signals according to the first input clock signal and the second input clock signal;

the driving module is used for generating a corresponding scanning signal according to the output clock signal.

Optionally, the display device according to at least one embodiment of the present invention further includes a display control circuit; the driving module includes an odd-row driving circuit and an even-row driving circuit;

the timing controller is used for providing a first input clock signal, a second input clock signal, a third input clock signal, and a fourth input clock signal for the display control circuit;

the display control circuit is used for providing a first group of output clock signals to the odd-row driving circuit according to the first input clock signal and the second input clock signal, and is used for providing a second group of output clock signals to the even-row driving circuit according to the third input clock signal and the fourth input clock signal;

the odd-row driving circuit is used for generating a corresponding odd-row scanning signal according to the first group of output clock signals;

the even-row driving circuit is configured to generate a corresponding even-row scanning signal based on the second set of output clock signals.

DETAILED DESCRIPTION

Figure 1A:
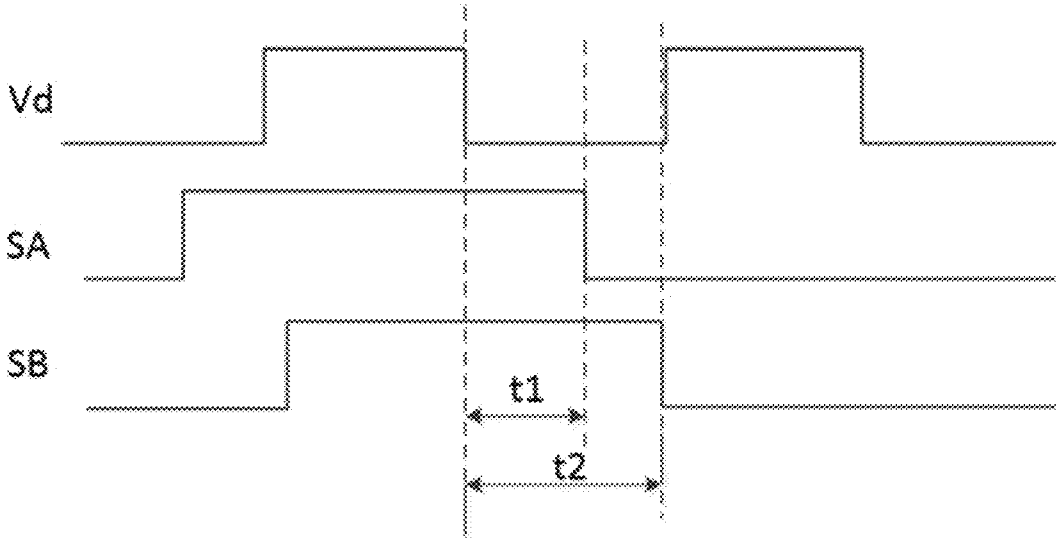
FIG. 1A is a timing diagram corresponding to a driving method according to at least one embodiment of the present invention.

The embodiments of the present disclosure will now be described more fully hereinafter with reference to the accompanying drawings, in which some, but not all embodiments of the disclosure are shown. Based on the embodiments in the present disclosure, all other embodiments obtained by a person of ordinary skill in the art without inventive effort fall within the scope of the present disclosure.

The driving method according to at least one embodiment of the present invention is applied to a display panel, the display panel including a plurality of rows of scanning lines, a plurality of columns of data lines, and a plurality of rows and a plurality of columns of pixel circuits, the pixel circuits being respectively electrically connected to corresponding rows of scanning lines and corresponding columns of data lines, the driving method includes:

controlling a first charging time to be greater than 0.5 times a second charging time, and controlling the first charging time to be less than the second charging time;

wherein the first charging time is a time for charging an Ath-row Mth-column pixel circuit via an Ath data voltage on the Mth-column data line;

the second charging time is a time for charging the Bth-row Mth-column pixel circuit via the Ath data voltage and a Bth data voltage on the Mth-column data line;

A, B and M being positive integers.

In a particular implementation, the Ath data voltage and the Bth data voltage may be the same; since the charging time for the Bth-row Mth-column pixel circuit is sufficient, and the charging time for the Ath-row Mth-column pixel circuit is insufficient, at least one embodiment of the present invention sets the first charging time to be greater than 0.5 times the second charging time, so as to ensure that the charging time for the Ath-row Mth-column pixel circuit is increased under the condition that the charging time for the Bth-row Mth-column pixel circuit is unchanged, improving the charging rate of the Ath-row Mth-column pixel circuit, and improving the display uniformity.

In at least one embodiment of the invention, B is greater than A, and B−A may be equal to 1, but is not limited thereto.

In a particular implementation, when A is not equal to B, the Ath data voltage and the Bth data voltage may not be the same.

Optionally, the Ath-row Mth-column pixel circuit is electrically connected to an Ath-row scanning line, and the Bth-row Mth-column pixel circuit is electrically connected to the Bth-row scanning line; the Ath-row scanning line is used for providing an Ath-row scanning signal, and the Bth-row scanning line is used for providing a Bth-row scanning signal;

the driving method includes: controlling a time interval between a falling edge time of the Ath-row scanning signal and a falling edge time of the Bth-row scanning signal to be less than a half of the time for charging the Bth-row Mth-column pixel circuit via the Ath data voltage and the Bth data voltage, so as to control the first charging time to be greater than 0.5 times of the second charging time, and to control the first charging time to be less than the second charging time.

In at least one embodiment of the present invention, the falling edge time of the Ath-row scanning signal is the falling edge time of the Ath-row scanning signal, and the falling edge time of the Bth-row scanning signal is the falling edge time of the Bth-row scanning signal;

The time interval between the falling edge time of the Ath-row scanning signal and the falling edge time of the Bth-row scanning signal may be: the time at which the potential of the Ath-row scanning signal is lowered to the low potential is separated from the time at which the potential of the Bth-row scanning signal is lowered to the low potential.

In at least one embodiment of the present invention, the Ath data voltage and the Bth data voltage may be the same, but are not limited thereto.

Optionally, the effective pulse width of the Ath-row scanning signal is the same as the effective pulse width of the Bth-row scanning signal.

Optionally, the effective pulse width of the Ath-row scanning signal is greater than the effective pulse width of the Bth-row scanning signal.

As shown in FIG. 1A, the data voltage provided for the Mth-column data line is labeled Vd, the Ath-row scanning signal is labeled SA, and the Bth-row scanning signal is labeled SB.

In at least one embodiment of the invention, B may be equal to, but is not limited to, A+1.

As shown in FIG. 1A, the first charging time t1 is the time for charging the Ath-row Mth-column pixel circuit via the Ath data voltage;

Reference numeral t2 is a second charging time for charging the Bth-row Mth-column pixel circuit by the Ath data voltage and the Bth data voltage.

As shown in FIG. 1A, t1 is greater than 0.5 times t2 and t1 is less than t2.

In at least one embodiment shown in FIG. 1A, both the Ath data voltage and the Bth data voltage are low voltages.

As shown in FIG. 1A, the effective pulse width of the Ath-row scanning signal SA is different from the effective pulse width of the Bth-row scanning signal SB, and the effective pulse width of the Ath-row scanning signal SA is larger than the effective pulse width of the Bth-row scanning signal SB.

In at least one embodiment as shown in FIG. 1A, the effective pulse width of the Ath-row scanning signal SA may be: a period of time for which the potential of the Ath-row scanning signal SA is maintained at a high voltage;

The effective pulse width of the Bth line scanning signal SB can be: a period of time for which the potential of the Bth-row scanning signal SB is maintained at a high voltage.

The timing shown in FIG. 1A may be a timing corresponding to H2 Line Pattern.

H2 Line Pattern refers to a pattern that contains two light rows nd two dark rows.

In high resolution products, the HSR (Hardware Super Resolution) timing ensures that even-rows are charged and odd rows are charged in half, and at high refresh rates and high resolutions, the 1H time (1H time is a row pixel charging time, 1H is related to the resolution and refresh frequency of the display panel) is short, resulting in odd rows being charged too short. In at least one embodiment of the invention, the falling edge of the odd-row scanning signal may be appropriately delayed to increase the charging time of the odd-row pixel circuit without affecting the charging time of the even-row pixel circuit. It can be seen from a real-time H2 Line 255 picture that the conventional HSR timing sequence has the problem of three rows of pixels being bright due to undercharging and mischarging. It should be noted that the odd rows and the even rows in the present invention are relative concepts, for example, if the ath row is an odd row, it can be defined that the (a+1) th row is an even row.

Figure 1B:
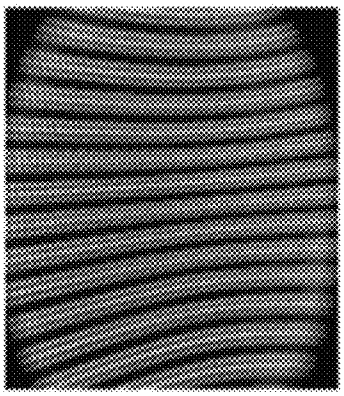
FIG. 1B is a display screen displaying abnormally when an H2 Line picture is displayed.
Figure 1C:
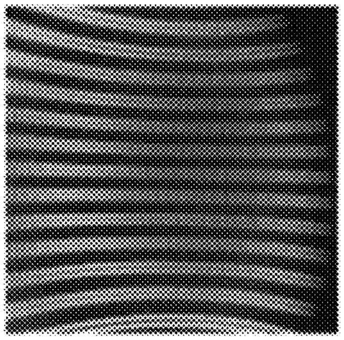
FIG. 1C is a display screen displaying normally when an H2 Line picture is displayed.

When the H2 Line picture is displayed, as shown in FIG. 1B, when an exception is displayed, three rows of pixels are displayed bright A picture with two lines of dark pixels, as shown in FIG. 1C, displays a picture with two lines of light pixels and two lines of dark pixels when the display is normal.

Figure 2:
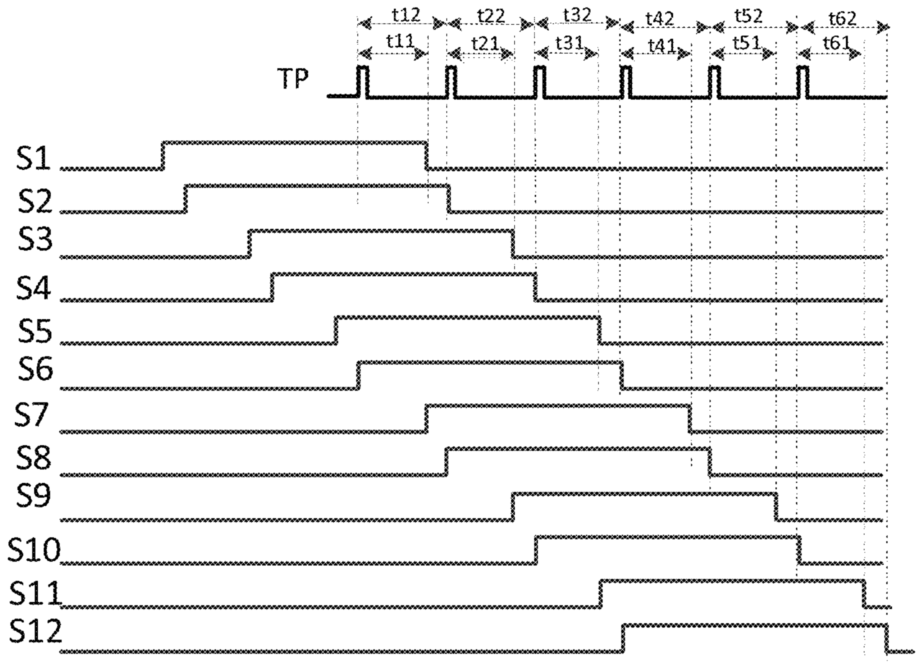
FIG. 2 is a timing diagram corresponding to a driving method according to at least one embodiment of the present invention.

As shown in FIG. 2, the reference numeral S1 is a first line scanning signal, the reference numeral S2 is a second line scanning signal, the reference numeral S3 is a third line scanning signal, the reference numeral S4 is a fourth line scanning signal, the reference numeral S5 is a fifth line scanning signal, and so on, the reference numeral S11 is an eleventh line scanning signal, and the reference numeral S12 is a twelfth line scanning signal;

In FIG. 2, the time for charging the first-row Mth-column pixel circuit via the first data voltage is labeled t11, and the time for charging the second-row Mth-column pixel circuit via the first data voltage is labeled t12;

- the time for charging the third-row Mth-column pixel circuit via the second data voltage is labeled t21, and the time for charging the fourth-row Mth-column pixel circuit via the second data voltage is labeled t22;
- the time for charging the fifth-row Mth-column pixel circuit via the third data voltage is labeled t31, and the time for charging the sixth-row Mth-column pixel circuit via the third data voltage is labeled t32;
- the time for charging the seventh-row Mth-column pixel circuit via the fourth data voltage is labeled t41, and the time for charging the eighth-row Mth-column pixel circuit via the fourth data voltage is labeled t42;
- the time for charging the ninth-row Mth-column pixel circuit via the fifth data voltage is labeled t51, and the time for charging the tenth-row Mth-column pixel circuit via the fifth data voltage is labeled t52;
- the time for charging the eleventh-row Mth-column pixel circuit via the sixth data voltage is labeled t61, and the time for charging the twelfth-row Mth-column pixel circuit via the sixth data voltage is labeled t62.

As shown in FIG. 2, t12 is greater than t11, and t11 is greater than 0.5 times t12; t22 is greater than t21, and t21 is greater than 0.5 times t22; t32 is greater than t31, and t31 is greater than 0.5 times t32; t42 is greater than t41, and t41 is greater than 0.5 times t42; t52 is greater than t51, and t51 is greater than 0.5 times t52; t62 is greater than t61, and t61 is greater than 0.5 times t62.

In FIG. 2, reference numeral S6 denotes a sixth-row scanning signal, reference numeral S7 denotes a seventh-row scanning signal, reference numeral S8 denotes an eighth-row scanning signal, reference numeral S9 denotes a ninth-row scanning signal, and reference numeral S10 denotes a tenth-row scanning signal.

In at least one embodiment shown in FIG. 2, the effective pulse width of S1 may be the same as the effective pulse width of S2, the effective pulse width of S3 may be the same as the effective pulse width of S4, the effective pulse width of S5 may be the same as the effective pulse width of S6, the effective pulse width of S7 may be the same as the effective pulse width of S8, the effective pulse width of S9 may be the same as the effective pulse width of S10, and the effective pulse width of S11 may be the same as the effective pulse width of S12.

In at least one embodiment shown in FIG. 2, the effective pulse width of S1 may be: a period of time for which the potential of S1 is maintained at a high voltage; the effective pulse width of S2 may be: a period of time for which the potential of S2 is maintained at a high voltage; the effective pulse width of S3 may be: a period of time for which the potential of S3 is maintained at a high voltage; the effective pulse width of S4 may be: a period of time for which the potential of S4 is maintained at a high voltage; the effective pulse width of S5 may be: a period of time for which the potential of S5 is maintained at a high voltage; the effective pulse width of S6 may be: a period of time for which the potential of S6 is maintained at a high voltage; the effective pulse width of 7 may be: a period of time for which the potential of S7 is maintained at a high voltage; the effective pulse width of S8 may be: a period of time for which the potential of S8 is maintained at a high voltage; the effective pulse width of S9 may be: a period of time for which the potential of S9 is maintained at a high voltage; the effective pulse width of S10 may be: a period of time for which the potential of S10 is maintained at a high voltage; the effective pulse width of S11 may be: a period of time for which the potential of S11 is maintained at a high voltage; the effective pulse width of S12 may be: a period of time for which the potential of S12 is maintained at a high voltage.

In at least one embodiment of the present invention, in the Nth frame, the Ath-row Mth-column pixel circuit is an even-row pixel circuit, and the Bth-row Mth-column pixel circuit is an odd-row pixel circuit; N is an integer.

In at least one embodiment of the present invention, in the (N+1) th frame, the Ath-row Mth-column pixel circuit is an odd-row of pixel circuits, and the Bth-row Mth-column pixel circuit is an even-row of pixel circuits; N is a positive integer.

Figure 3:
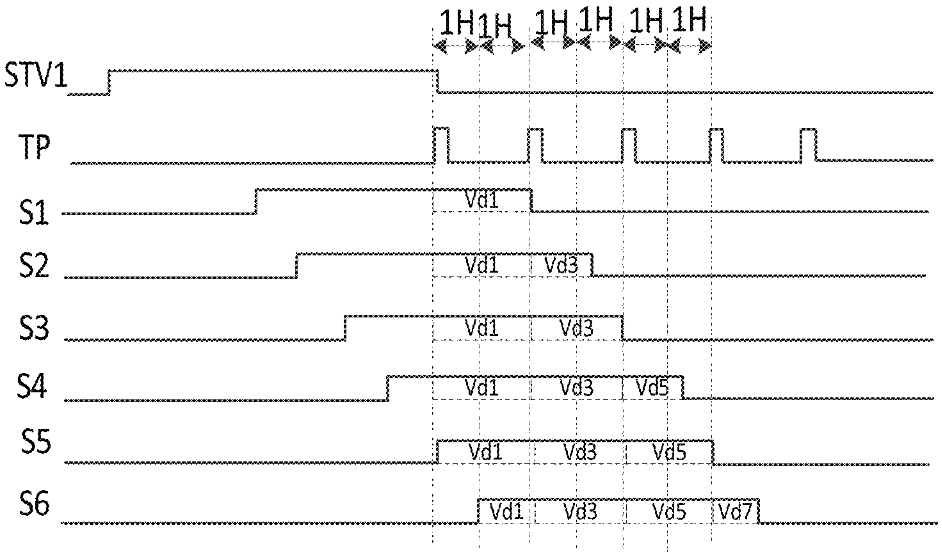
FIG. 3 is a timing diagram corresponding to a driving method according to at least one embodiment of the present invention.

As shown in FIG. 3, in the HSR time sequence, in odd frames, even pulses of the TP signal are blanked, i.e. the data signals of two rows are the same, the charging time of the pixel circuit of the odd rows is 2H time, the charging time of the pixel circuit of the odd rows is sufficient, and the data is interpolated from two adjacent rows in the even-rows. Namely, referring to FIG. 3, with regard to S1, if S1 is defined as a first row scanning signal, the time for filling the first data voltage Vd1 with the first row pixel circuit (the first row pixel circuit accesses the first row scanning signal S1) is 2H, the time for filling the third data voltage Vd3 with the third row pixel circuit (the third row pixel circuit accesses the third row scanning signal S3) is 2H, and the time for filling the fifth data voltage Vd5 with the fifth row pixel circuit (the fifth row pixel circuit accesses the fifth row scanning signal S5) is 2H; A second row of pixel circuits (the second row of pixel circuits accessing a second row scanning signal S2) is charged with a first data voltage Vd1 and a third data voltage Vd3; wherein in the overlapping part of the effective levels of S1 and S2, i.e. the high level, the second row of pixel circuits is charged with a first data voltage Vd1, the first data voltage Vd1 being a pre-charging voltage of the second row, and a third data voltage Vd3 being a data voltage of the present row actually needing to be charged into the second row of pixel circuits. Referring to FIG. 3, for an odd-row pixel circuit, the time for which the data voltage is actually charged is 2H, and for an even-row pixel circuit, the time for which the data voltage of its own row is actually charged is less than 2H. In order to improve the display quality, balancing the charging difference between the odd-row pixel circuit and the even-row pixel circuit, the falling edge of the even-row scanning signal can be shifted back, and at this time, optionally, the effective pulse width corresponding to each line scanning signal is the same, for example, referring to FIG. 3, the effective pulse widths corresponding to S1, S2, S3, S4, S5, and S6 respectively are the same, for example, the high-level pulse width is the same; of course, the effective pulse width of the even-row scanning signal can be both shifted and the pulse width of the even-row scanning signal can be adjusted, namely, the pulse width of the even-row scanning signal is increased, so as to improve the display quality, which is not limited herein.

As shown in FIG. 3, the falling edge of the even-row scanning signal can be moved back, i.e. moving the active pulse of the even row back, so as to improve the charging time of the pixel circuit of the even row and improve the display uniformity; with reference to FIG. 3, the charging time of the third data voltage Vd3 actually charged in the second-row pixel circuit (the second-row pixel circuit is connected to the second-row scanning signal S2) is greater than 1H, and if not moved, the charging time of the third data voltage Vd3 actually charged in the second-row pixel circuit is less than or equal to 1H; therefore, the embodiments of the present invention can balance different row charging times and improve the display quality.

In FIG. 3, the reference numeral TP is a data voltage trigger control signal. The reference numeral S1 is a first-row scanning time, the reference numeral S2 is a second-row scanning time, the reference numeral S3 is a third-row scanning time, the reference numeral S4 is a fourth-row scanning time, the reference numeral S5 is a fifth line scanning time, and the reference numeral S6 is a sixth line scanning time;

When the potential of the TP signal rises from a low level to a high level, the corresponding data line changes the data voltage provided thereby, i.e. the rising edge of the TP signal triggers the data signal to be written out, or alternatively, the falling edge of the TP signal triggers the data signal to be written out, which is not limited herein.

As shown in FIG. 3, the falling edge of S2 is shifted backward, the falling edge of S4 is shifted backward, and the falling edge of S6 is shifted backward so as to increase the charging time of the pixel circuits in the second row, increase the charging time of the pixel circuits in the fourth row, increase the charging time of the pixel circuits in the sixth row, and so on, so as to increase the charging time of the pixel circuits in the even row which is actually less charged.

In FIG. 3, the reference numeral STV1 is a start signal; the reference numeral Vd1 denotes a first data voltage, the reference numeral Vd3 denotes a third data voltage, the reference numeral Vd5 denotes a fifth data voltage, and the reference numeral Vd7 denotes a seventh data voltage.

In FIG. 3, Vd1, Vd3, Vd5, and Vd7 shown in a dashed box indicate that the data voltage on the Mth-column data line is Vd1, Vd3, Vd5, and Vd7 during the period of time.

Figure 4:
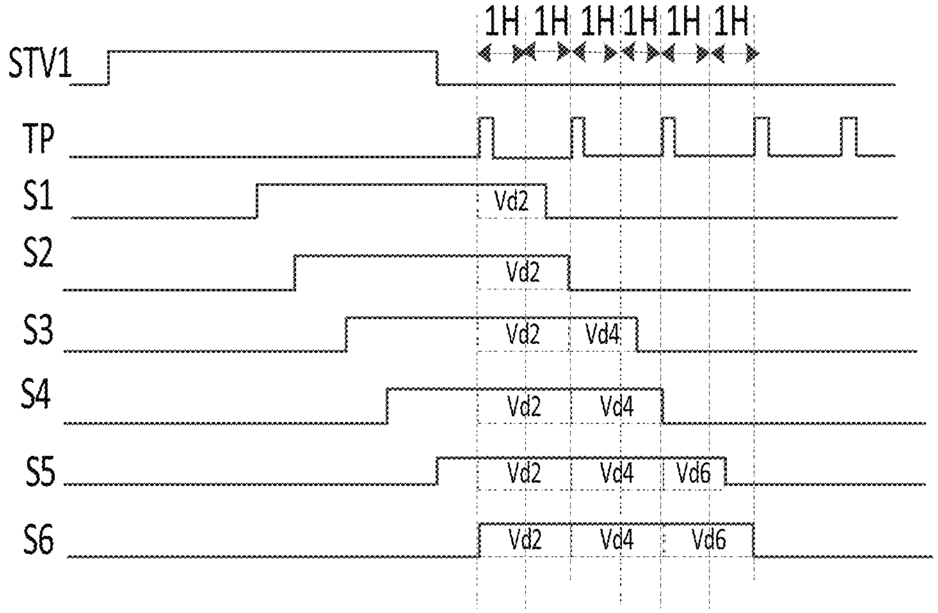
FIG. 4 is a timing diagram corresponding to a driving method according to at least one embodiment of the present invention.

As shown in FIG. 4, in the HSR timing sequence, in an even frame, odd pulses of the TP signal are blanked, that is to say, the data signals of two rows are the same, the charging time of the pixel circuit of the even-row is 2H time, the charging time of the pixel circuit of the even-row is sufficient, and the odd row interpolates data from two adjacent rows. Referring to FIG. 4, with regard to S2, if it is defined that S2 is a second row scanning signal, the time for the second-row pixel circuits (the second-row pixel circuits accessing the second-row scanning signal S2) to be filled with the second data voltage Vd2 is 2H, the time for the fourth-row pixel-circuits (the fourth-row pixel circuits accessing the fourth-row scanning signal S4) to be filled with the fourth data voltage Vd4 is 2H, and the time for the sixth-row pixel circuits (the sixth-row pixel circuits accessing the sixth-row scanning signal S6) to be filled with the sixth data voltage Vdd is 2H; a third-row pixel circuits (the third-row pixel circuits accessing a third row scanning signal S3) being charged with a second data voltage Vd2 and a fourth data voltage Vd4; wherein at the effective level of S2 and S3, namely, the overlapping part of the high level, the third row of pixel circuits is charged with a second data voltage Vd2, the second data voltage Vd2 is a pre-charging voltage for the third row, and the fourth data voltage Vd4 is a data voltage of the present row actually needing to be charged into the third-row pixel circuits. Referring to FIG. 4, for an even-row pixel circuit, the time for which the data voltage is actually charged is 2H, and for an odd-row pixel circuit, the time for which the data voltage of its own row is actually filled is less than 2H. In order to improve the display quality and balance the charging difference between the odd-row pixel circuit and the even-row pixel circuit, the falling edge of the odd-row scanning signal can be shifted back, and at this time, optionally, the effective pulse width corresponding to each row scanning signal is the same, for example, referring to FIG. 4, the effective pulse widths corresponding to S1, S2, S3, S4, S5 and S6 respectively are the same, for example, the high-level pulse width is the same; of course, the effective pulse width of the odd-row scanning signal can be both shifted and the pulse width of the odd-row scanning signal can be adjusted, i.e. the pulse width of the odd-row scanning signal is increased to improve the display quality, which is not limited herein.

As shown in FIG. 4, the falling edge of the odd-row scanning signal can be moved back, i.e. the odd-row active pulse is moved back to increase the time to charge the odd-row pixel circuit, increasing the display uniformity.

Referring to FIG. 4, the charging time of the fourth data voltage Vd4 actually charged in the third-row pixel circuit (the third-row pixel circuit is connected to the third row scanning signal S3) is greater than 1H, and if not moved, the charging time of the fourth data voltage Vd4 actually charged in the third-row pixel circuit is less than or equal to 1H, and therefore an embodiment of the present invention can balance different row charging times and improve the display quality.

In FIG. 4, the reference numeral TP is a data voltage trigger control signal. The reference numeral SI is a first-row scanning time, the reference numeral S2 is a second-row scanning time, the reference numeral S3 is a third-row scanning time, the reference numeral S4 is a fourth-row scanning time, the reference numeral S5 is a fifth-row scanning time, and the reference numeral S6 is a sixth-row scanning time;

When the potential of the TP signal rises from a low level to a high level, the corresponding data line changes the data voltage provided thereby, i.e. the rising edge of the TP signal triggers the data signal to be written out, or alternatively, the falling edge of the TP signal triggers the data signal to be written out, which is not limited herein.

As shown in FIG. 4, the falling edge of S1 is shifted back, the falling edge of S3 is shifted back, and the falling edge of S5 is shifted back, so as to increase the charging time of the pixel circuit in the first row, increase the charging time of the pixel circuit in the third row, and increase the charging time of the pixel circuit in the fifth row, etc. which are actually less charged, and the charging time of the pixel circuit in the odd rows is increased.

In FIG. 4, the reference numeral STV1 is a start signal; the reference numeral Vd2 denotes a second data voltage, the reference numeral Vd4 denotes a fourth data voltage, and the reference numeral Vd6 denotes a sixth data voltage.

In FIG. 4, Vd2, Vd4, and Vd6 shown in dashed boxes indicate that the data voltage on the Mth-column data line is Vd2, Vd4, and Vd6 during the period of time.

It should be noted that the present invention can also blank odd-row data for odd frames and blank even-row data for even frames, and is not limited thereto. In the present invention, the specific blanking may be performed after the complete image data output by the system chip SOC is processed by the timing controller TCON, or may also be that the image input to the SOC is the processed image data, i.e. only the odd-row data signal or the even-row data signal is retained, and the specific blanking method is not limited again.

In at least one embodiment of the present invention, the Ath data voltage and the Bth data voltage are the same data voltage; the Ath-row Mth-column pixel circuit is electrically connected to an Ath-row scanning line, and the Bth-row Mth-column pixel circuit is electrically connected to a Bth-row scanning line; the Ath-row scanning line is used for providing an Ath-row scanning signal, and the Bth-row scanning line is used for providing a Bth-row scanning signal;

- the driving method further includes: controlling a first time to be greater than a second time;
- the first time is a time interval between a time when the Mth-column data line starts to provide the Ath data voltage and a falling edge time of the Ath-row scanning signal;
- the second time is a time interval between a falling edge time of the Ath-row scanning signal and a falling edge time of the Bth-row scanning signal.

Figure 5A:
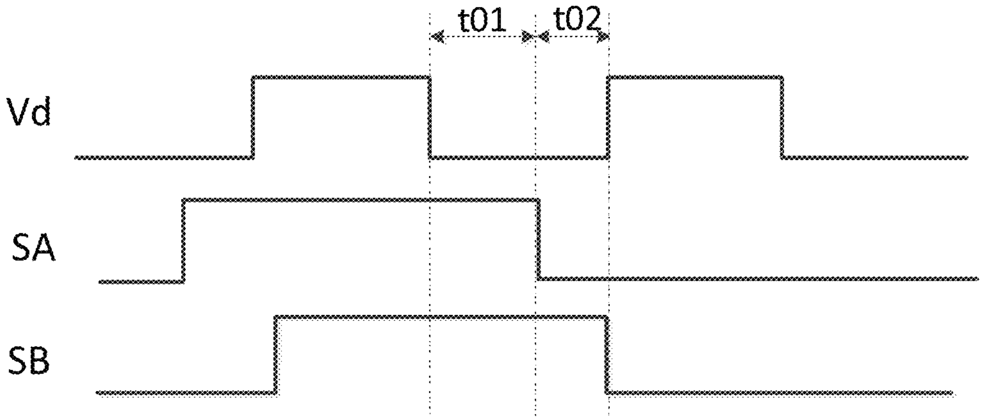
FIG. 5A is a timing diagram corresponding to a driving method according to at least one embodiment of the present invention.

In Normal display mode, the phase adjustment of the scanning signal can also be used to improve the problem of mischarging and undercharging in a partial Pattern. As shown in FIG. 5A, taking the H2 Line picture as an example, the charging time and thus the charging rate of the odd-row pixel circuit can be increased by postponing the phase of the odd-row scanning signal.

In FIG. 5A, a data voltage supplied to the Mth-column data line is labeled Vd, the first-row scanning signal is labeled SA, and the second-row scanning signal is labeled SB.

In at least one embodiment shown in FIG. 5A, both the Ath data voltage and the Bth data voltage are low voltages.

As shown in FIG. 5A, the time interval between the time when the Mth-column data line starts to provide the Ath data voltage and the falling edge time of the Ath-row scanning signal SA is a first time t01;

The time interval between the falling edge time of the Ath-row scanning signal and the falling edge time of the Bth-row scanning signal is a second time t02;

By setting the first time t01 to be greater than the second time t02, i.e. delaying the phase of the Ath-row scanning signal SA, the charging time of the Ath-row Mth-column pixel circuit is increased, so that the charging time of the Ath-row Mth-column pixel circuit is greater than 1H time, and the charging time of the Bth-row Mth-column pixel circuit is equal to 2H time.

Optionally, the Ath-row Mth-column pixel circuit is electrically connected to the Ath-row scanning line, and the Bth-row Mth-column pixel circuit is electrically connected to the Bth-row scanning line;

- the Ath-row scanning line is used for providing an Ath-row scanning signal, and the Bth-row scanning line is used for providing the Bth-row scanning signal;
- an effective pulse width of the Ath-row scanning signal is not equal to an effective pulse width of the Bth-row scanning signal.

As shown in FIG. 5A, the effective pulse width of the Ath-row scanning signal SA is not equal to the effective pulse width of the Bth-row scanning signal SB;

The effective pulse width of the Ath-row scanning signal SA is greater than that of the Bth-row scanning signal SB;

The effective pulse width of the Ath-row scanning signal SA is the duration of the electric potential of SA being a high voltage;

The effective pulse width of the Bth-row scanning signal SB is the time during which the potential of the SB lasts at a high voltage.

As shown in FIG. 5A, the high-level pulse width of the data voltage Vd is equal to the low-level pulse width of the data voltage Vd.

Referring to the scanning signal phase adjustment scheme as shown in FIG. 5A, for a checkerboard picture, an H3 Line picture (the H3 Line picture can be a three-line bright three-line dark picture), a Crosstalk picture, or the like, the Pattern can improve the problem of undercharging the borderline pixels by using retardation of the phase whole or part of the scanning signal, or by using the advance of the phase whole or part of the scanning signal.

Figure 5B:
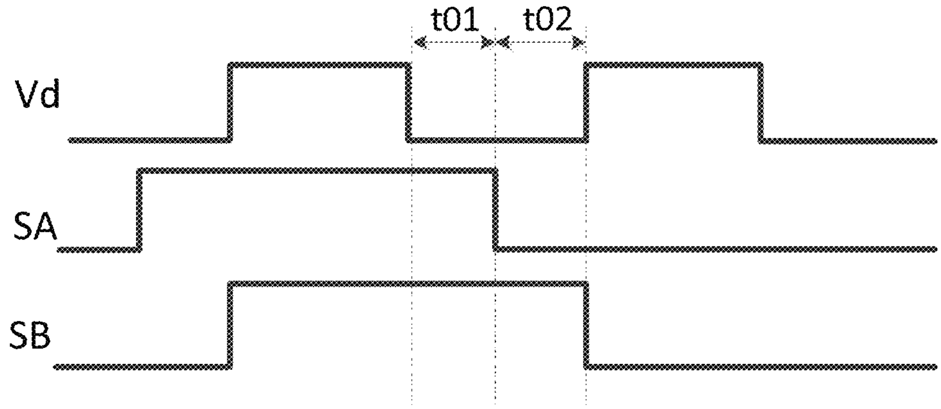
FIG. 5B is a timing diagram of a related scanning signal corresponding to FIG. 5A.

FIG. 5B is a timing diagram of a related scanning signal corresponding to FIG. 5A. As shown in FIG. 5B, the first time t01 is equal to the second time t02, and the effective pulse width of the Ath-row scanning signal SA is equal to the effective pulse width of the Bth-row scanning signal SB.

Figure 5C:
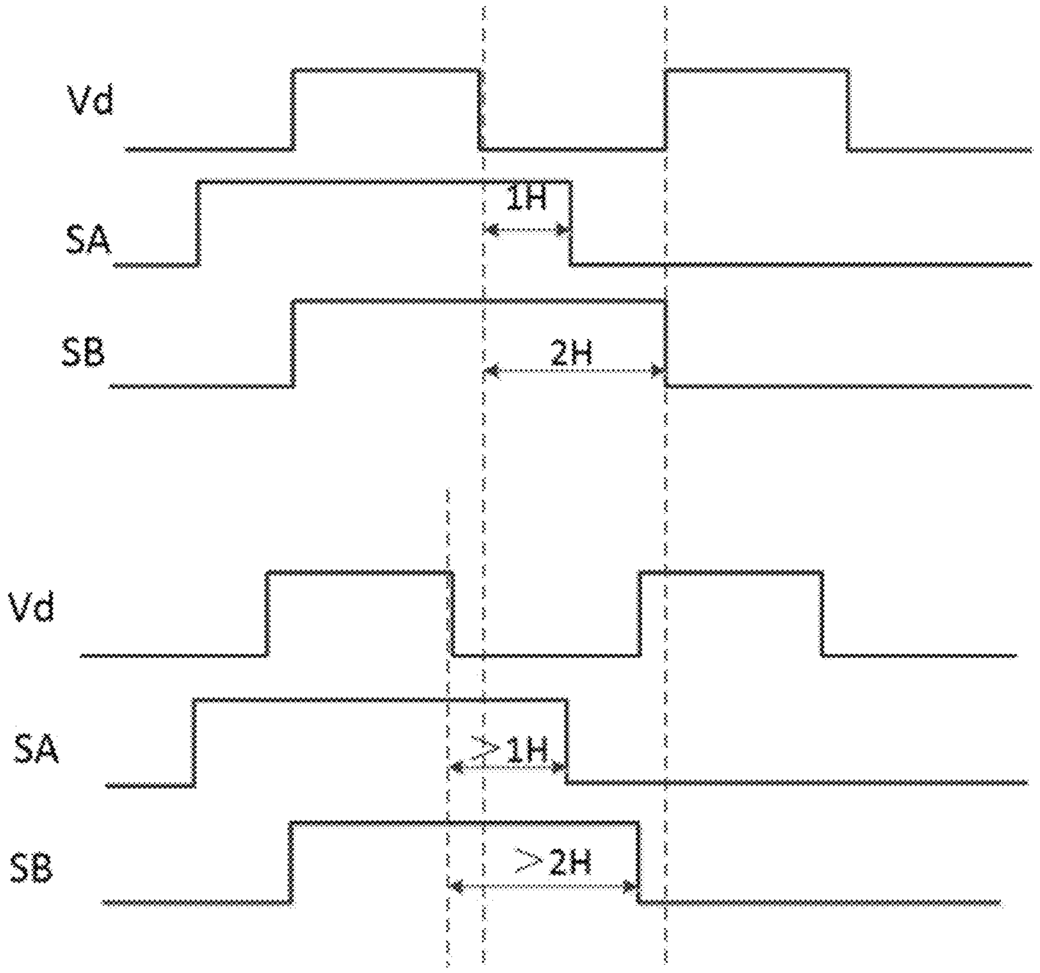
FIG. 5C is a comparison of the timing diagram of the scanning signal of the embodiment of the present invention shown in FIG. 5A and the timing diagram of the related scanning signal shown in FIG. 5B.

FIG. 5C is a comparison of the timing diagram of the scanning signal of the embodiment of the present invention shown in FIG. 5A and the timing diagram of the related scanning signal shown in FIG. 5B.

The driving method according to at least one embodiment of the present invention is applied to a display panel, the display panel comprising a plurality of rows of scanning lines, a plurality of columns of data lines, and a plurality of rows and a plurality of columns of pixel circuits, the pixel circuits being respectively electrically connected to corresponding rows of scanning lines and corresponding columns of data lines. the driving method comprising:

when a fall time of an Ath-row scanning signal provided by an Ath-row scanning line is less than a fall time of a Bth-row scanning signal provided by a Bth-row scanning line, controlling a third time to be greater than a fourth time;

the third time is a time interval between a time when an Mth-column data line starts to provide an Ath data voltage to an Ath-row Mth-column pixel circuit and a time when the potential of the Ath-row scanning signal starts to decrease;

the fourth time is a time interval between a time when the Mth-column data line starts to provide a Bth data voltage to a Bth-row Mth-column pixel circuit and a time when the potential of the Bth-row scanning signal starts to decrease;

A, B, and M being positive integers, and A is not equal to B.

In at least one embodiment of the present invention, when the fall time of the Ath-row scanning signal is less than the fall time of the Bth-row scanning signal, the time interval between the time when the Mth-column data line starts to supply the Ath data voltage to the Ath-row Mth-column pixel circuit and the time when the potential of the Ath-row scanning signal starts to fall may be set to be greater than the time interval between the time when the Mth-column data line starts to supply the Bth data voltage to the Bth-row Mth-column pixel circuit and the time when the potential of the Bth-row scanning signal starts to fall. So that the charging time of the Ath-row Mth-column pixel circuit is substantially the same as the charging time of the Bth-row Mth-column pixel circuit to improve display uniformity.

In at least one embodiment of the invention, the fall time of the Ath-row scanning signal is: a time interval from a time point when the potential of the Ath-row scanning signal starts to decrease from a high voltage to a time point when the potential of the Ath-row scanning signal decreases to a low voltage;

the fall time of the Bth line scanning signal is: a time interval from a time point when the potential of the Bth-row scanning signal starts to drop from a high voltage to a time point when the potential of the Bth-row scanning signal drops to a low voltage.

In at least one embodiment of the present invention, the Ath data voltage is not equal to, but is not limited to, the Bth data voltage.

Optionally, the driving method is applied to a display panel, and the display panel comprises a first gate driving circuit and a second gate driving circuit;

the first gate driving circuit and the second gate driving circuit share a pull-up node; the first gate driving circuit and the second gate driving circuit both access a first clock signal end providing a first clock signal and a second clock signal end providing a second clock signal;

when the potential of the first clock signal jumps from a first level to a second level, the potential of the pull-up node is a first voltage value, and when the potential of the second clock signal jumps from the first level to the second level, the potential of the pull-up node is a second voltage value; the first voltage value is not equal to the second voltage value;

when the potential of the first clock signal jumps from a high level to a low level, the potential of the pull-up node becomes a third voltage value, and when the potential of the second clock signal jumps from a high level to a low level, the potential of the pull-up node is a fourth voltage value; the third voltage value is not equal to the fourth voltage value.

In at least one embodiment of the present invention, the first level may be a low level and the second level may be a high level, but is not limited thereto.

Figure 6A:
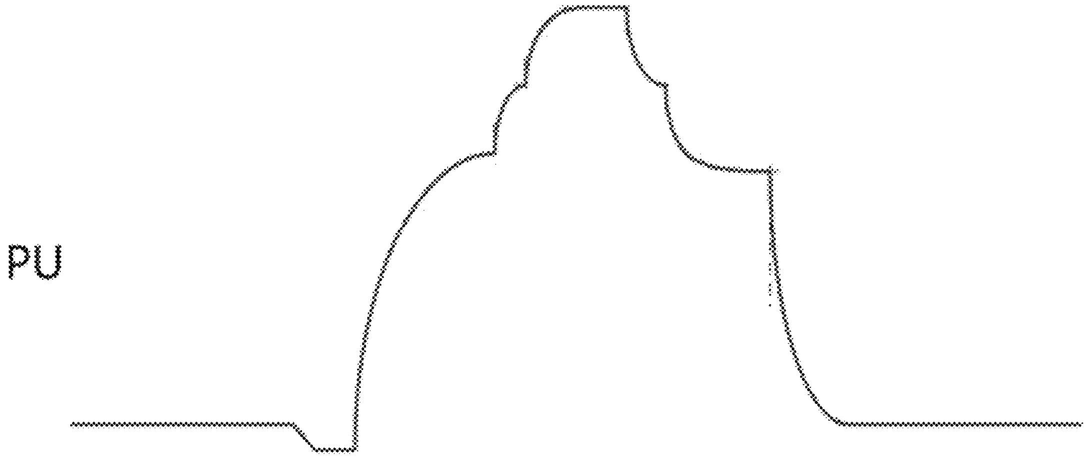
FIG. 6A is a waveform diagram of the potential of the pull-up node PU.

FIG. 6A is a timing diagram of the potential of the pull-up node PU.

In at least one embodiment of the present invention, an adjacent row gate driving circuit shares a pull-up node, and in this case, since the potential of the pull-up node corresponding to the adjacent row gate driving signal is different, the adjacent row gate driving circuit charging is different; therefore, the driving method according to the embodiments of the present invention improves the above-mentioned charging difference problem by changing the timing of a scanning signal (the scanning signal can be a gate driving signal).

Figure 6B:
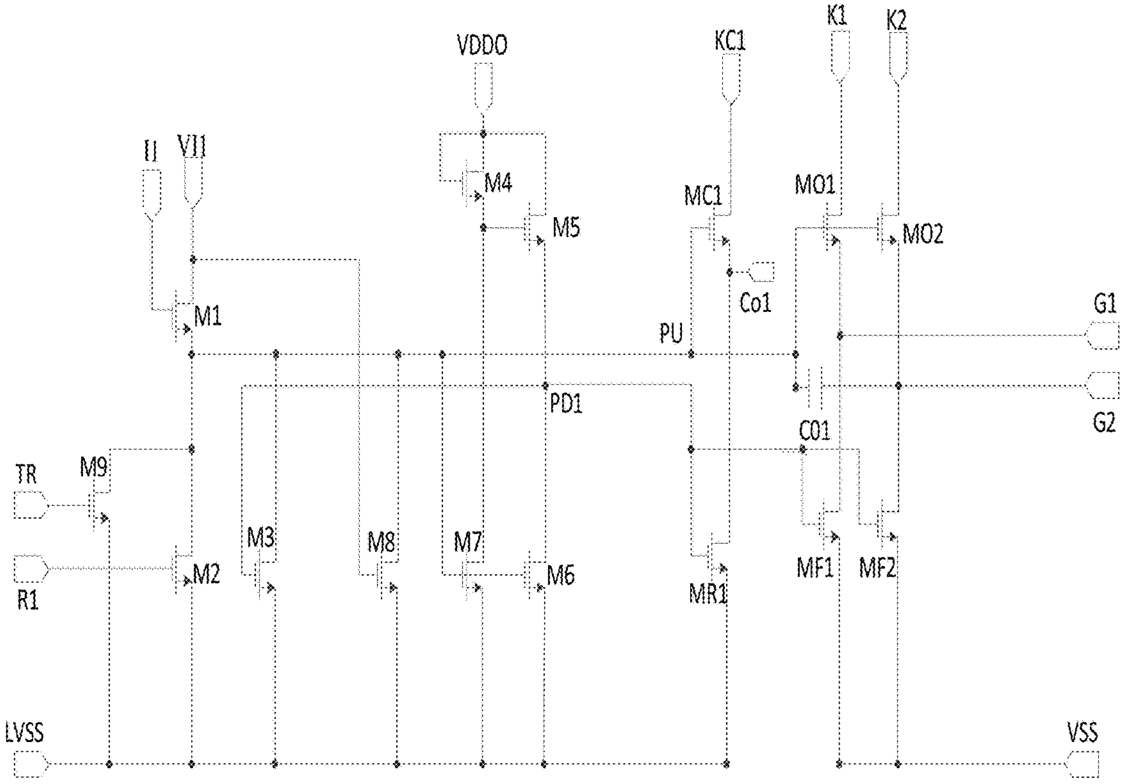
FIG. 6B is a circuit diagram of at least one embodiment of a gate driving circuit employing a pull-up node PU.

FIG. 6B is a circuit diagram of at least one embodiment of a gate driving circuit employing a pull-up node PU that generates a two-stage gate driving signal under control of the pull-up node PU.

As shown in FIG. 6B, at least one embodiment of the gate driving circuit comprises a first transistor M1, a second transistor M2 and a third transistor M3, a fourth transistor M4, a fifth transistor M5, a sixth transistor M6, a seventh transistor M7, a first capacitor C01, an eighth transistor M8, a ninth transistor M9, a first output transistor MO1, a second output transistor MO2, a first carry output transistor MC1, a first output reset transistor MF1, a second output reset transistor MF2 and a first carry reset transistor MR1;

the gate electrode of the first transistor M1 is electrically connected to a first input end I1, a source electrode of the first transistor M1 is electrically connected to a first input voltage end VI1, and a drain electrode of the first transistor M1 is electrically connected to the pull-up node PU;

the gate electrode of the second transistor M2 is electrically connected to the first reset end R1, the source electrode of the second transistor M2 is electrically connected to the pull-up node PU, and the drain electrode of the second transistor M2 is electrically connected to the first low voltage end LVSS;

the gate electrode of the third transistor M3 is electrically connected to the first pull-down node PD1, the source electrode of the third transistor M3 is electrically connected to the pull-up node PU, and the drain electrode of the third transistor M3 is electrically connected to the first low voltage end LVSS;

the gate electrode of the fourth transistor M4 and the source electrode of the fourth transistor M4 are both electrically connected to the first control voltage end VDDO, and the drain electrode of the fourth transistor M4 is electrically connected to the first pull-down control node;

the gate electrode of the fifth transistor M5 is electrically connected to the first pull-down control node, the source electrode of the fifth transistor M5 is electrically connected to the first control voltage terminal VDDO, and the drain electrode of the fifth transistor M5 is electrically connected to the first pull-down node PD1;

the gate electrode of the sixth transistor M6 is electrically connected to the pull-up node PU, a source electrode of the sixth transistor M6 is electrically connected to the first pull-down node PD1, and a drain electrode of the sixth transistor M6 is electrically connected to the first low voltage end LVSS;

the gate electrode of the seventh transistor M7 is electrically connected to the pull-up node PU, a source electrode of the seventh transistor M7 is electrically connected to the first pull-down control node, and a drain electrode of the seventh transistor M7 is electrically connected to the first low voltage end LVSS;

the gate electrode of the eighth transistor M8 is electrically connected to the first input voltage terminal VI1, the source electrode of the eighth transistor M8 is electrically connected to the pull-up node PU, and the drain electrode of the eighth transistor M8 is electrically connected to the first low voltage terminal LVSS;

the gate electrode of the ninth transistor M9 is electrically connected to the frame reset end TR, the source electrode of the ninth transistor M9 is electrically connected to the pull-up node PU, and the drain electrode of the ninth transistor M9 is electrically connected to the first low voltage end LVSS;

the gate electrode of the first output transistor MO1 is electrically connected to the pull-up node PU, the source electrode of the first output transistor MO1 is electrically connected to the first clock signal end K1, and the drain electrode of the first output transistor MO1 is electrically connected to the first scanning signal output end G1;

the gate electrode of the second output transistor MO2 is electrically connected to the pull-up node PU, the source electrode of the second output transistor MO2 is electrically connected to the second clock signal end K2, and the drain electrode of the second output transistor MO2 is electrically connected to the second scanning signal output end G2;

the gate electrode of the first carry output transistor MC1 is electrically connected to the pull-up node PU, a source electrode of the first carry output transistor MC1 is electrically connected to a first carry clock signal end KC1, and a drain electrode of the first carry output transistor MC1 is electrically connected to a first carry signal output end Co1;

the gate electrode of the first output reset transistor MF1 is electrically connected to the first pull-down node PD1, the source electrode of the first output reset transistor MF1 is electrically connected to the first scanning signal output end G1, and the drain electrode of the first output reset transistor MF1 is electrically connected to the second low voltage end VSS;

the gate electrode of the second output reset transistor MF2 is electrically connected to the first pull-down node PD1, the source electrode of the second output reset transistor MF2 is electrically connected to the second scanning signal output end G2, and the drain electrode of the second output reset transistor MF2 is electrically connected to the second low voltage end VSS;

the gate electrode of the first carry reset transistor MR1 is electrically connected to the first pull-down node PD1, the source electrode of the first carry reset transistor MR1 is electrically connected to the first carry signal output end Co1, and the drain electrode of the first carry reset transistor MR1 is electrically connected to the first low voltage end LVSS;

a first end of the first capacitor C01 is electrically connected to the pull-up node PU, and a second end of the first capacitor C01 is electrically connected to the second scanning signal output terminal G2.

Figure 6C:
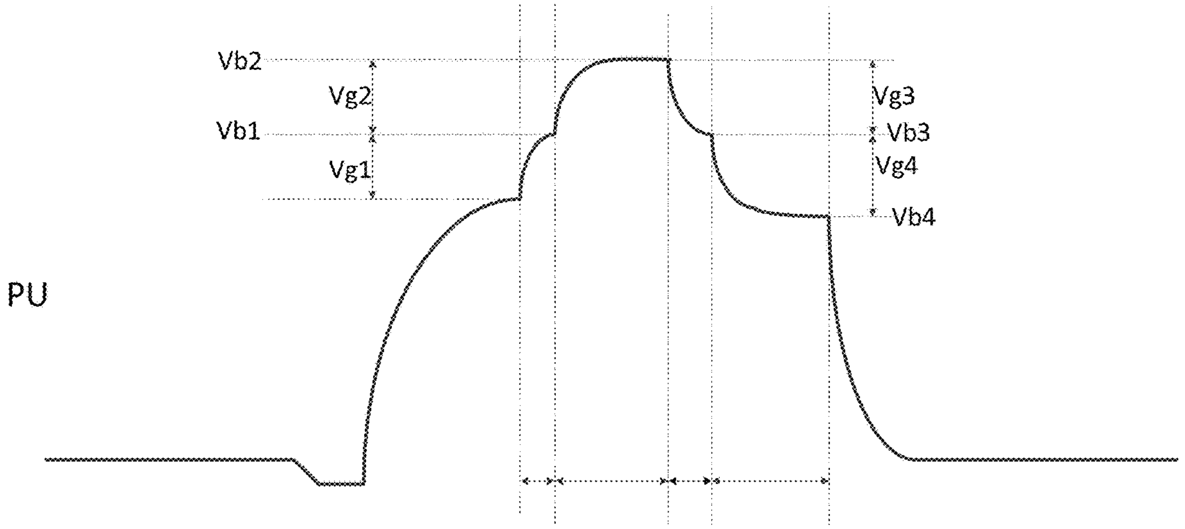
FIG. 6C is a waveform diagram of the potential of the pull-up node PU.

When at least one embodiment of the gate driving circuit as shown in FIG. 6B is in operation, when I1 is electrically connected to a first carry signal output end of an adjacent upper gate driving circuit, and VII is electrically connected to a first driving signal output end of the adjacent upper gate driving circuit;

when I1 provides a high voltage signal, M1 is opened, as shown in FIG. 6C, so as to pull up the potential of PU, so as to pull up the potential of PU to a high voltage, at this moment, K1, K2 and KC1 all provide a low voltage signal, and therefore G1, G2, and Co1 all output a low voltage signal; M4 is turned on, M6 and M7 are both turned on so as to control the potential of the PD1 to be a low voltage, and the transistors with the gates electrically connected to the PD1 are all turned off;

after that, the potential of the first clock signal provided by K1 jumps from a low level to a high level, and as shown in FIG. 6C, the potential of the PU increased to a higher potential; within a first time t1, the potential of the pull-up node PU increases by a first potential height Vg1, and the potential of the pull-up node PU becomes a first voltage value Vb1;

then, the potential of the second clock signal provided by K2 jumps from a low level to a high level, and as shown in FIG. 6C, the potential of the PU is increased to a higher potential; within a second time t2, the potential of the pull-up node PU increases by a second potential height Vg2, and the potential of the pull-up node PU changes to a second voltage value Vb2;

after that, the potential of the first clock signal provided by K1 jumps from a high level to a low level, and as shown in FIG. 6C, the potential of the PU is adjusted to be a lower potential; in a third time t3, the potential of the pull-up node PU decreases by a third potential height Vg3, and the potential of the pull-up node PU becomes a third voltage value Vb3;

after that, the potential of the second clock signal provided by K2 jumps from a high level to a low level, and as shown in FIG. 6C, the potential of the PU is adjusted to be a lower potential; within a fourth time t4, the potential of the pull-up node PU decreases by a fourth potential height Vg4, and the potential of the pull-up node PU becomes a fourth voltage value Vb4, and at this moment, the potential of the pull-up node PU can be a low level;

when the potential of the PU is a high voltage, the MO1, the MO2, and the MC1 are opened, the G1 is in communication with the K1, the G2 is in communication with the K2, and the Co1 is in communication with the KC1, the G1 outputs a corresponding first driving signal, the G2 outputs a corresponding second driving signal, and the Co1 outputs a corresponding first carry signal;

when the potential of PU is a low voltage, M4 is turned on, M6 and M7 are turned off, the potential of the first pull-down control node is a high voltage, M5 is turned on, the potential of PD1 is a high voltage, MF1, MF2 and MR1 are turned on, and G1, G2, and Co1 all output a low level.

In operation of at least one embodiment of the gate driving circuit as shown in FIG. 6B, since the potential of PU is lower when the potential of the second clock signal provided by K2 decreases from a high level to a low level than when the potential of the first clock signal provided by K1 decreases from a high level to a low level, the decrease time of the second scanning signal provided by the second scanning signal output terminal G2 is longer than the decrease time of the first scanning signal provided by the first scanning signal output terminal G1.

Figure 7:
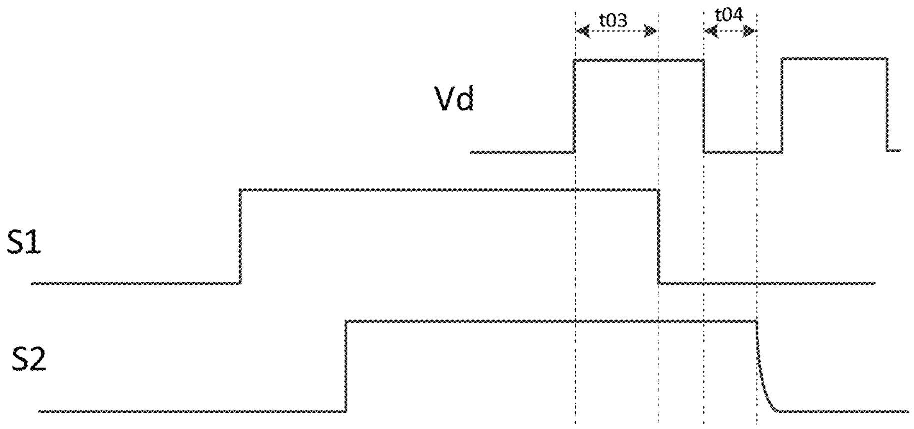
FIG. 7 is a timing diagram corresponding to a driving method according to at least one embodiment of the present invention.

As shown in FIG. 7, a data voltage provided for the Mth-column data line is labeled Vd; where the label is S1 is a first row scanning line, and where the label is S2 is a second row scanning line;

the first data voltage is a high voltage signal, and the second data voltage is a low voltage signal;

the third time t03 is the time interval between the time when the Mth-column data line starts to supply the first data voltage to the first-row Mth-column pixel circuit and the time when the potential of the first row scanning signal starts to decrease;

the fourth time t04 is the time interval between the time when the Mth-column data line starts to supply the second data voltage to the second-row Mth-column pixel circuit and the time when the potential of the second row scanning signal starts to decrease;

since the fall time of S2 is greater than the fall time of S1, by setting t03 to be greater than t04, so as to increase the time for the first data voltage to charge the first-row Mth-column pixel circuit, optionally, the time for the first-row Mth-column pixel circuit to be charged is approximately equal to the time for the second-row Mth-column pixel circuit to be charged by the voltage of the second data. It should be noted here that the first row and the second row are examples and do not represent the actual first row and the second row in the display panel, and may be any other adjacent rows of pixels, and are not limited thereto.

As shown in FIG. 7, the data charging time for a scanning line with a delayed falling edge is less than the data charging time for a scanning line without a delayed falling edge; for example, the data charging time of a first-row pixel circuits (the first-row pixel circuits accessing the first-row scanning signal S1) is less than the data charging time of a second-row pixel circuits (the second-row pixel circuits accessing the second-row scanning signal S2).

Alternatively, the time interval between the time when the potential of the Ath-row scanning signal starts to decrease and the time when the Mth-column data line stops providing the Ath data voltage is greater than the time interval between the time when the potential of the Bth-row scanning signal starts to decrease and the time when the Mth-column data line stops providing the Bth data voltage.

Figure 8:
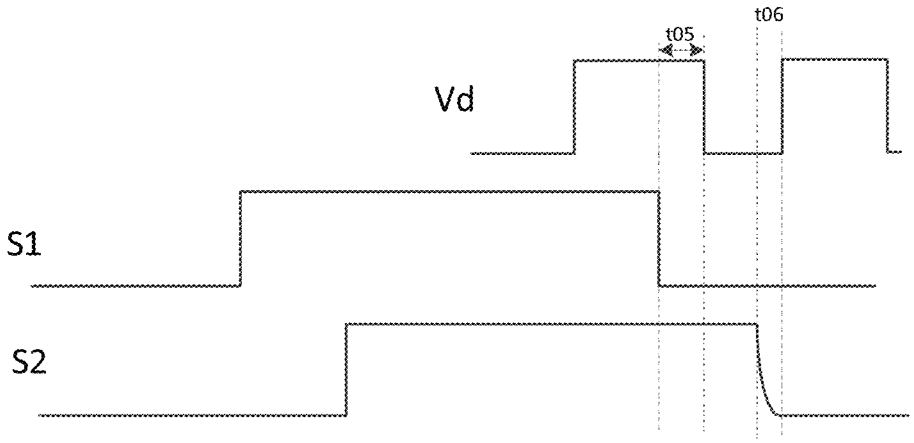
FIG. 8 is a timing diagram corresponding to a driving method according to at least one embodiment of the present invention.

As shown in FIG. 8, on the basis of FIG. 7, the time interval between the time when the potential of the first row scanning signal S1 starts to fall and the time when the Mth-column data line stops providing the first data voltage is a fifth time t05;

the time interval between the time when the potential of the second row scanning signal S2 starts to fall and the time when the Mth-column data line stops providing the second data voltage is a sixth time t06;

t05 is greater than t06.

In at least one embodiment shown in FIG. 8, the fifth time t05 is a first GOE time (the GOE time may be a data voltage delay time) and the sixth time t06 is a second GOE time.

The driving method according to at least one embodiment of the present invention is applied to a display panel, the display panel comprising a plurality of rows of scanning lines, a plurality of columns of data lines, and a plurality of rows and a plurality of columns of pixel circuits, the pixel circuits being respectively electrically connected to corresponding rows of scanning lines and corresponding columns of data lines.

when an Ath data voltage provided by an Mth-column data line is different from a Bth data voltage provided by the Mth-column data line, controlling a time for charging a Bth-row Mth-column pixel circuit via the Bth data voltage to be greater than a charging time threshold;

A, B and M being positive integers, and A is not equal to B.

In a particular implementation, when the Ath data voltage is different from the Bth data voltage, the charging time for the Bth-row Mth-column pixel circuit via the Bth data voltage can be controlled to be greater than a charging time threshold, so as to promote the charging time of the first-row pixel circuits after the data voltage conversion, improve the problem of insufficient charging thereof, and improve the first row display problem at the boundary.

Figure 9A:
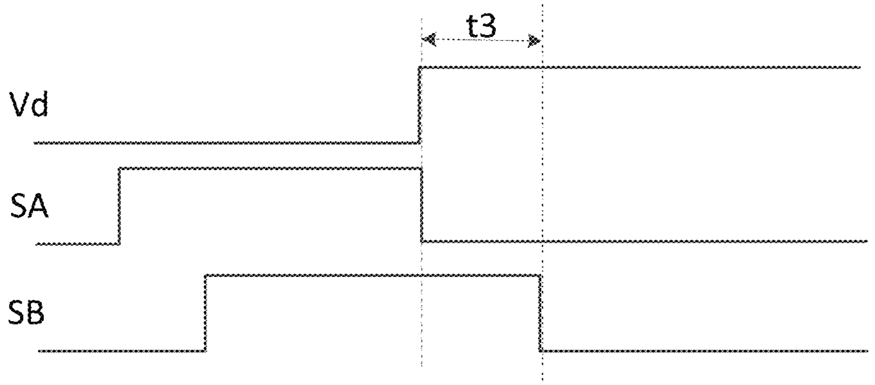
FIG. 9A is a timing diagram corresponding to a driving method according to at least one embodiment of the present invention.

In FIG. 9A, the data voltage supplied to the Mth-column data line is labeled Vd, the Ath-row scanning signal is labeled SA, and the Bth-row scanning signal is labeled SB.

As shown in FIG. 9A, when a checkerboard picture (for example, a row direction black-and-white interval and a column direction black-and-white interval are set) changes from black to white, for example, when the grey level is changed from 0 to 255 (it is of course also possible to change other low grey levels to high grey levels), the Ath data voltage is a low voltage, and the Bth data voltage is a high voltage, the embodiment of the present invention advances the falling edge of the Ath-row scanning signal, and synchronously controls the data voltage provided by the Mth-column data line to change from a low voltage to a high voltage. So that the charging time of the first-row pixel circuits after the picture conversion (the first-row pixel circuits after the picture conversion being the Bth-row pixel circuits) is increased, improving the problem that the charging time of the first line of pixel circuits after the picture conversion is insufficient, while the charging of the last line of pixel circuits before the picture conversion (the last-row pixel circuits before the picture conversion being the Ath-row pixel circuits) is not affected because the pre-charging voltage and the actual voltage are the same.

Alternatively, the charging time threshold may be, but is not limited to, 1H time.

As shown in FIG. 9A, the Ath data voltage provided by the Mth-column data line is different from the Bth data voltage provided by the Mth-column data line, and the time for charging the Bth-row Mth-column pixel circuit via the Bth data voltage is a third charging time t3;

The third charging time t3 is greater than 1H time, and is raised to the time when the Bth data voltage is charged to the Bth-row Mth-column pixel circuit.

Figure 9B:
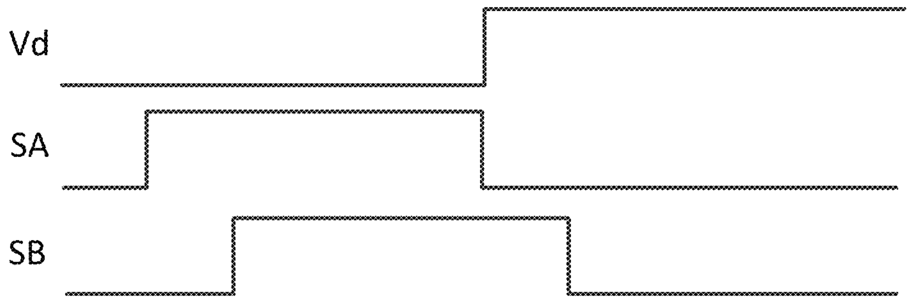
FIG. 9B is a timing diagram of a related scanning signal corresponding to FIG. 9A.
Figure 9C:
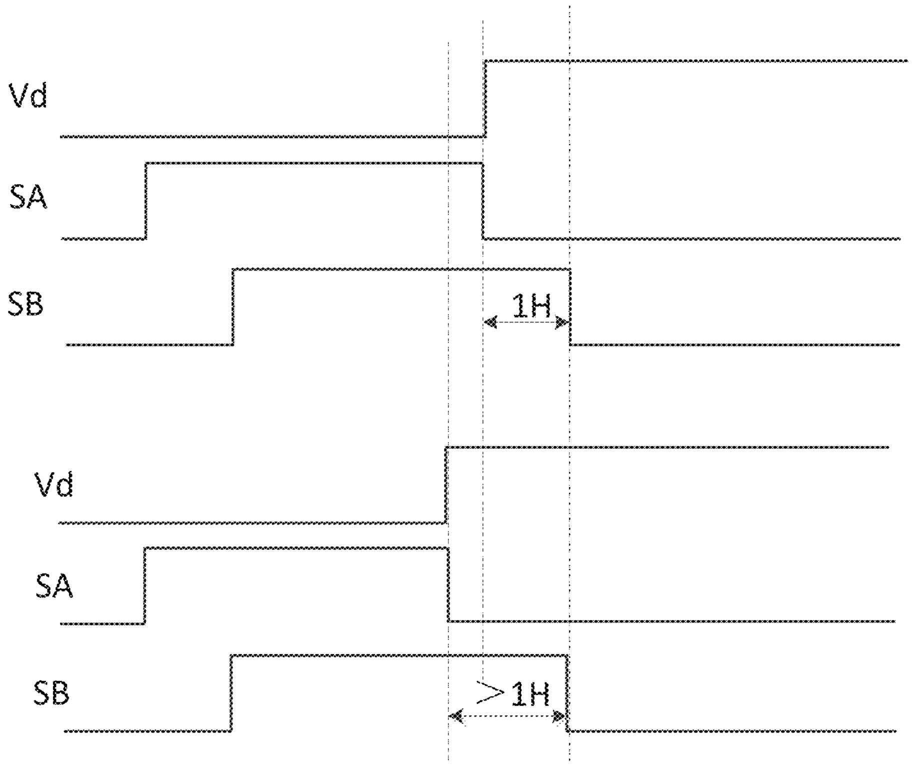
FIG. 9C is a comparison of the timing diagram of the scanning signal of the embodiment of the present invention shown in FIG. 9A and the timing diagram of the related scanning signal shown in FIG. 9B.

FIG. 9B is a timing diagram corresponding to the correlated scanning signal of FIG. 9A, and FIG. 9C is a comparison of the timing diagram of the scanning signal corresponding to the embodiment of the present invention illustrated in FIG. 9A and the correlated scanning signal illustrated in FIG. 9B.

As shown in FIG. 9C, in at least one embodiment of the present invention, the Bth-row Mth-column pixel circuits are charged by the Bth data voltage for a time greater than 1H, while in the related art, the Bth-row Mth-column pixel circuits are charged by the Bth data voltage for a time equal to 1H. By using the driving method according to at least one embodiment of the present invention, it is possible to increase the time for charging the Bth-row Mth-column pixel circuit by the Bth data voltage.

With regard to the checkerboard Pattern, taking the checkerboard black-to-white as an example, in the first row after conversion, since the difference between the pre-charged data voltage and the data voltage to be actually charged is large, when the actual charging time is 1H time, for a high resolution and high refresh rate display product, there is a problem of insufficient charging, resulting in the first row darkening at the boundary. In accordance with at least one embodiment of the present invention, the Ath-row scanning signal is turned off in advance, and the Bth data voltage is supplied in advance in synchronization, so that the charging time of the converted first row pixel circuit increases, thereby improving the problem of insufficient charging time.

In at least one embodiment of the present invention, the Ath-row Mth-column pixel circuit is electrically connected to an Ath-row scanning line, and the Bth-row Mth-column pixel circuit is electrically connected to the Bth-row scanning line; the Ath-row scanning line is used for providing an Ath-row scanning signal, and the Bth-row scanning line is used for providing a Bth-row scanning signal;

an effective pulse width of the Ath-row scanning signal is less than an effective pulse width of the Bth-row scanning signal.

As shown in FIG. 9A, the effective pulse width of the Ath-row scanning signal SA is less than the effective pulse width of the Bth-row scanning signal SB;

the effective pulse width of the Ath-row scanning signal SA is: a period of time for which the potential of the Ath-row scanning signal SA is maintained a high voltage;

the effective pulse width of the Bth line scanning signal SB is: a period of time for which the potential of the Bth-row scanning signal SB is maintained at a high voltage.

Optionally, the step of controlling a time for charging a Bth-row Mth-column pixel circuit via the Bth data voltage to be greater than a charging time threshold, comprises:

increasing a time interval between a falling edge time of the Ath-row scanning signal and a falling edge time of the Bth-row scanning signal, so as to control the time for charging the Bth-row Mth-column pixel circuit via the Bth data voltage to be greater than a charging time threshold.

In a particular implementation, the time for charging the Bth-row Mth-column pixel circuit via the Bth data voltage can be controlled to be greater than a charging time threshold by increasing the time interval between the falling edge time of the Ath-row scanning signal and the falling edge time of the Bth-row scanning signal; for example, it is possible to advance the falling edge time of the Ath-row scanning signal to charge the Bth-row Mth-column pixel circuit by the Bth data voltage.

At least one embodiment of the present invention proposes three driving methods for improving charging unevenness in a display panel and improving a pixel charging rate, and the details are as follows:

(1) Under the HSR mode, the charging time of the pixel circuit in the odd rows is insufficient or the charging time of the pixel circuit in the even-rows is insufficient, and a scanning signal phase adjustment method can be used to increase the charging time of the pixel circuit in the odd rows or the charging time of the pixel circuit in the even-rows, so as to improve the charging rate of the pixel circuit in the odd rows or the pixel circuit in the even-rows;

(2) With regard to the pixel circuit with the same or similar voltage to be precharged and actually charged, reducing the duty ratio of the scanning signal to terminate the beam charging in advance, and at the same time advancing the data voltage signal of the pixel circuit in the next row, the charging rate of the pixel circuit in the next row can be increased on the basis of ensuring the charging of the pixel circuit in the previous row; this scheme can improve the charging rate of the pixel circuit at the boundary of Pattern such as checkerboard picture, H2 Line picture, H3 Line picture, and Crosstalk picture, and improve the defects such as residual image and Fine Pitch, especially for the problem of insufficient charging of 8K display products, which can effectively improve the product quality;

(3) With regard to the current structure of a driving module in which there is a difference in the fall times of scanning signals of two or more adjacent scanning signals, periodically adjusting the GOE time can be used to achieve a comparable charging rate.

The above driving method may be used alone or in combination with at least two-by-two driving to improve display quality, and is not limited thereto.

Figure 10:
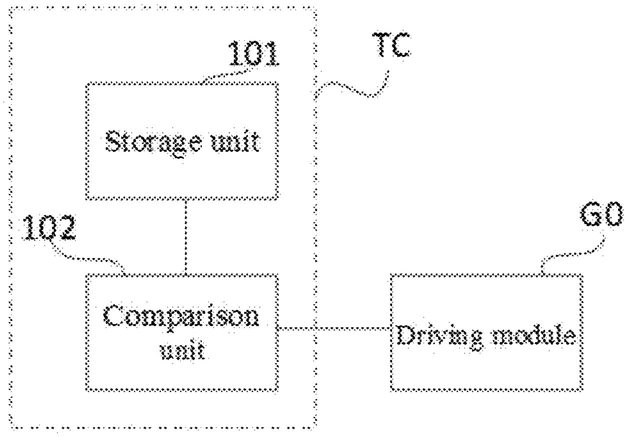
FIG. 10 is a schematic diagram showing a connection relationship between a timing controller and a driving module in a display device according to at least one embodiment of the present invention.

A display device according to an embodiment of the present invention comprises a display panel, a timing controller, and a driving module;

As shown in FIG. 10, the timing controller TC comprises a storage unit 101 and a comparison unit 102;

the storage unit 101 stores a specific picture;

the comparison unit 102 is used for comparing a picture to be displayed with a specific picture, and when the picture to be displayed and the specific picture are the same or are partially the same, providing an indication signal to a driving module G0, optionally adjusting and changing a data signal and/or a gate driving circuit GOA signal via a timing controller, and invoking the above-mentioned driving method for different specific pictures;

the driving module GO is used for invoking the above-mentioned driving method when receiving the indication signal.

In at least one embodiment of the present invention, the above driving method can be implemented by adding a picture detection function, and when the comparison unit is forced to obtain that a picture to be displayed which is input by the system chip SOC is the same as a specific picture, such as an H2 Line picture, an H3 Line picture, a checkerboard picture, a HSR mode picture, etc. an indication signal is provided to a driving module so as to invoke the driving method according to at least one embodiment of the present invention.

In at least one embodiment of the present invention, when it is detected that the charging voltages of two adjacent rows of pixel circuits or several adjacent rows of pixel circuits are the same or similar, and there is a gray-scale jump in the pixel circuit of the subsequent row, the driving method may be activated to perform scanning signal and/or data signal duty cycle and phase adjustment, which may not be limited to a specific Pattern.

Figure 11:
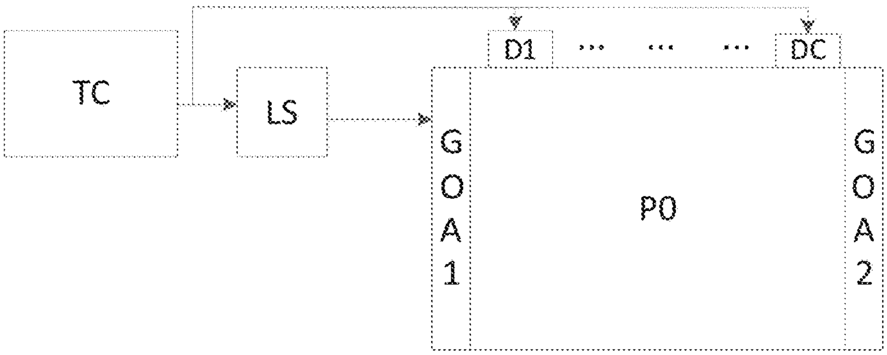
FIG. 11 is a block diagram of a display device according to at least one embodiment of the present invention.

In FIG. 11, the reference numeral TC is a timing controller, the reference numeral LS is a level shifter, and the reference numeral P0 is a display panel.

In FIG. 11, the reference numeral GOA1 is a first driving circuit comprised in a driving module, reference numeral GOA2 is a second driving circuit comprised in the driving module, reference numeral D1 is a first data driving chip, reference numeral DC is a Cth data driving chip, and C is an integer greater than 1.

Scan signal timing adjustment, scanning signal pulse width adjustment, and data voltage timing adjustment in accordance with at least one embodiment of the present invention may be implemented by a timing controller TC. Scan signal timing adjustment and data voltage timing adjustment can be of the data voltage can be realized by using the current timing controller TC, and the pulse width adjustment of the scanning signal requires a new IC (integrated circuit) to realize the pulse width adjustment of the scanning signal at a specific position.

Figure 12:
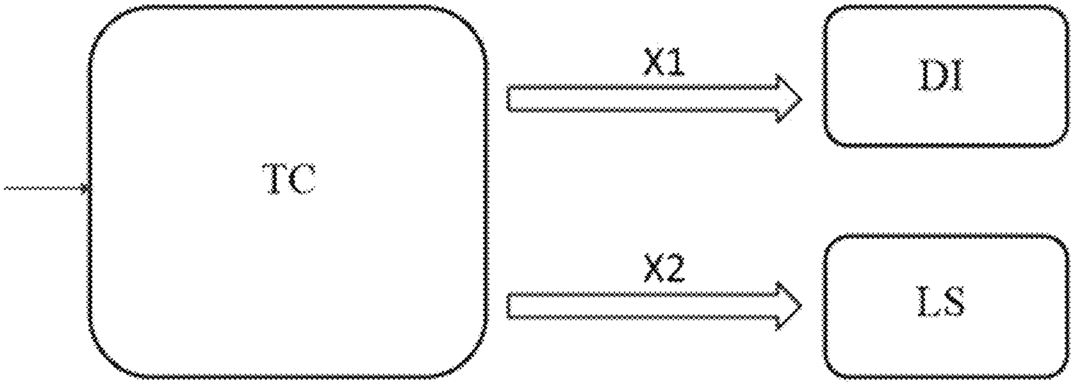
FIG. 12 is a schematic diagram illustrating a signal transmission relationship among a timing controller, a data driver and a level shifter in a display device according to at least one embodiment of the present invention.

In FIG. 12, reference numeral TC is a timing controller, reference numeral X1 is a data voltage signal, reference numeral X2 is a scanning signal, reference numeral D1 is a data driver, and reference numeral LS is a level shifter.

As shown in FIG. 12, the timing controller TC requires a picture detection function and prestores a Pattern to be detected (the Pattern to be detected may be, for example, an H2 Line picture, an H3 Line picture, a checkerboard picture, or a Crosstalk picture). After a front-end SOC signal (an input signal) is input into the timing controller TC, the timing controller TC performs Pattern detection and comparison; when the Pattern required to be displayed is the same as the pre-stored Pattern, the timing controller TC correspondingly changes the data voltage signal X1 and the scanning signal X2; and with regard to different Pattern to be displayed, the timing controller TC can make different processing manners, thereby achieving using different adjustment manners with regard to different Pattern.

The display device according to at least one embodiment of the present invention may further include a display control circuit; the timing controller is used for providing a first input clock signal and a second input clock signal for the display control circuit;

the display control circuit is used for providing and outputting a plurality of output clock signals according to the first input clock signal and the second input clock signal;

the driving module is used for generating a corresponding scanning signal according to the output clock signal.

Figure 13:
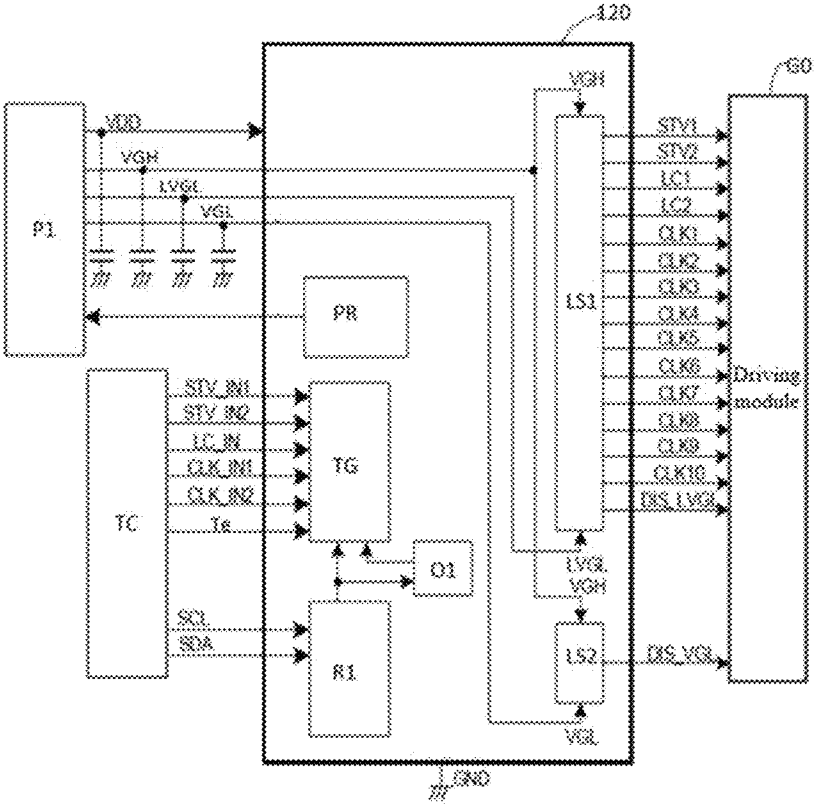
FIG. 13 is a block diagram of a display device according to at least one embodiment of the invention.

In FIG. 13, the reference numeral P1 denotes a power management circuit, the reference numeral TC denotes a timing controller, the reference numeral 120 denotes a display driving circuit, and the reference numeral G0 denotes a driving module;

Reference numeral TG is a timing generator, reference numeral R1 is a register, reference numeral O1 is an oscillator, reference numeral LS1 is a first level shifter, and reference numeral LS2 is a second level shifter;

Reference sign VDD is a first high voltage signal, reference numeral VGH is a second high voltage signal, reference numeral LVGL is a first low voltage signal, reference numeral VGL is a second low voltage signal, reference numeral STV_IN1 is a first input start signal, reference numeral STV_IN2 is a second input start signal, reference numeral LC_IN is a GOA noise reduction input signal, reference numeral CLK_IN1 is a first input clock signal, reference numeral CLK_IN2 is a second input clock signal, and reference numeral Te is a clock termination signal; where the reference numeral SCL is a clock line, and the reference numeral SDA is a bidirectional data line; the reference numeral PR is a protection circuit; the reference numeral GND is ground;

The reference numeral STV1 is a first start signal labeled, the reference numeral STV2 is a second start signal labeled, the reference numeral LC1 is a first GOA noise reduction output signal, the reference numeral LC2 is a second GOA noise reduction output signal, the reference numeral CLK1 is a first clock signal labeled, the reference numeral CLK2 is a second clock signal labeled, the reference numeral CLK3 is a third clock signal labeled, the reference numeral CLK4 is a fourth clock signal labeled, the reference numeral CLK5 is a fifth clock signal labeled, the reference numeral CLK6 is a sixth clock signal labeled, the reference numeral CLK7 is a seventh clock signal labeled, the reference numeral CLK8 is an eighth clock signal, the reference numeral CLK1 is a first clock signal, the reference numeral CLK2 is a second clock signal, the reference numeral CLK9 is a ninth clock signal, and the reference numeral CLK10 is a tenth clock signal; the reference numeral DIS_VGL is the third low voltage signal labeled and the reference numeral DIS_LVGL is the fourth low voltage signal labeled.

Figure 14:
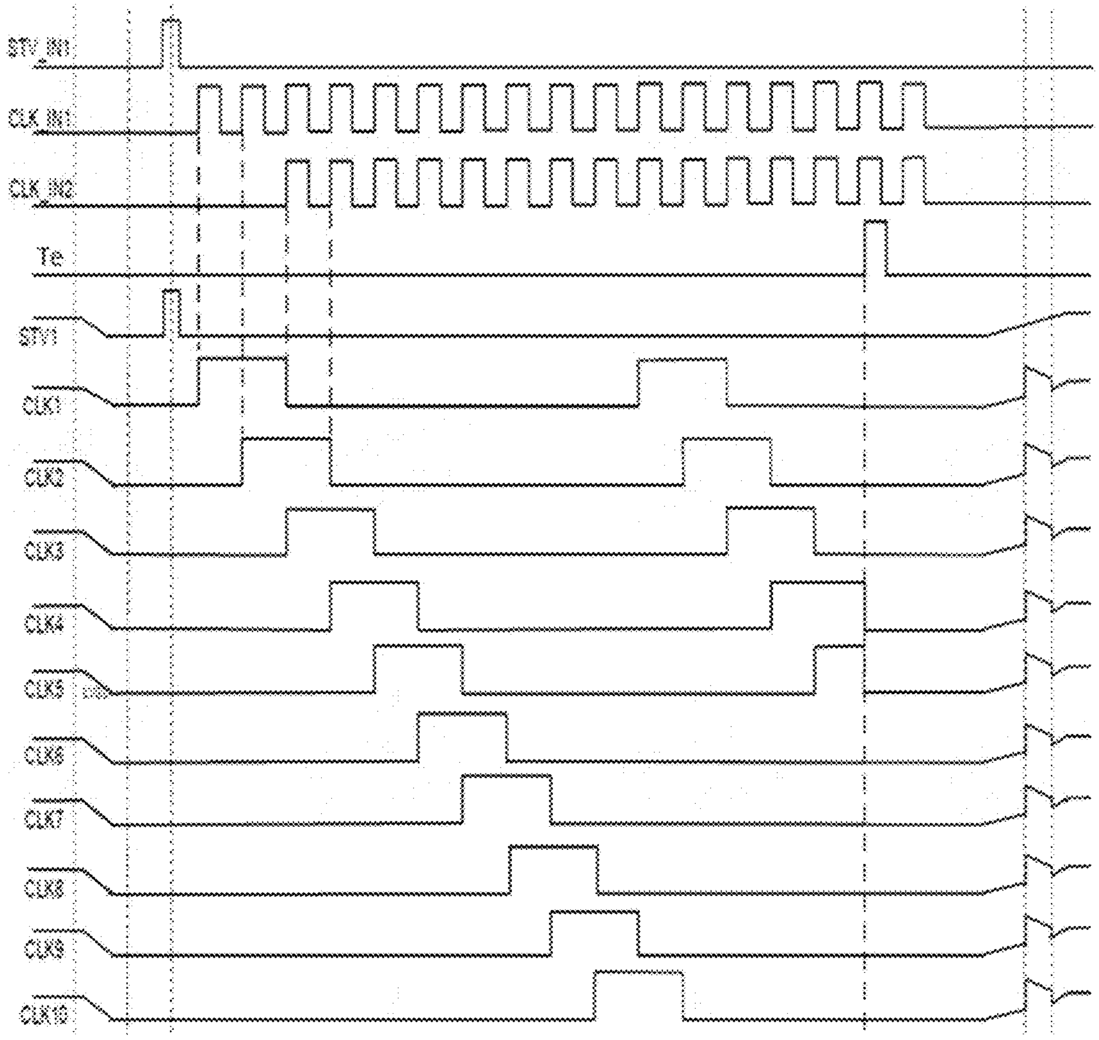
FIG. 14 is an operational timing diagram of at least one embodiment of the display device shown in FIG. 13 according to the present invention.

In FIG. 14, the reference numeral STV_IN1 is a first input start signal, the reference numeral CLK_IN1 is a first input clock signal, the reference numeral CLK_IN2 is a second input clock signal, and the reference numeral Te is a clock end signal; the reference numeral STV1 is a first start signal, the reference numeral CLK1 is a first clock signal, the reference numeral CLK2 is a second clock signal, the reference numeral CLK3 is a third clock signal, the reference numeral CLK4 is a fourth clock signal, the reference numeral CLK5 is a fifth clock signal, the reference numeral CLK6 is a sixth clock signal, the reference numeral CLK7 is a seventh clock signal, the reference numeral CLK8 is an eighth clock signal, the reference numeral CLK1 is a first clock signal, the reference numeral CLK2 is a second clock signal, the reference numeral CLK9 is a ninth clock signal, and the reference numeral CLK10 is a tenth clock signal.

When the first level shifter LS1 in FIG. 13 is in operation, the LS1 front end receives the first input clock signal CLK_IN1 and the second input clock signal CLK_IN2 provided by the timing controller TC, generates a required clock signal via the timing generator TG, and then obtains the first clock signal CLK1 to the tenth clock signal CLK10 after performing level conversion on the LS1.

The implementation of the first level shifter LS1 generating the first clock signal CLK1 to the tenth clock signal CLK10 is: the rising edges of the CLK_IN1 are rising edges of various clock signals, for example, the first ten rising edges of the CLK_IN1 are successively the first rising edges of the first clock signal CLK1 to the tenth clock signal CLK10, the eleventh rising edges to the twentieth rising edges of the CLK_IN1 are successively the second rising edges of the first clock signal CLK1 to the tenth clock signal CLK10, and so on; the rising edge of CLK_IN2 is the falling edge of each clock signal, the first ten rising edges of CLK_IN2 are the first falling edge of the first clock signal CLK1 to the tenth clock signal CLK10 in sequence, the eleventh rising edge to the twentieth rising edge of CLK_IN2 are the second falling edge of the first clock signal CLK1 to the tenth clock signal CLK10 in sequence, and so on.

At least one embodiment of the present invention relates to varying the duty cycle and timing of the scanning signal. The timing controller may be implemented by controlling the rising edge positions of CLK_IN1 and CLK_IN2. For example, to reduce the time that the first potential of CLK1 is maintained at a high voltage, this can be done by delaying the time that the first rising edge of CLK_IN1 arrives, or by advancing the time that the first rising edge of CLK_IN2 arrives.

In at least one embodiment of the present invention, when it is required to postpone the odd-row scanning signal or the even-row scanning signal, two level shifters may be used to respectively control the clock signal provided to the odd row driving circuit and the clock signal provided to the even-row driving circuit, for example, the two level shifters included are a first level shifter to control the odd row and a second level shifter to control the even-row, respectively, the first level shifter includes CLK_IN1 and CLK_IN2, and the second level shifter includes CLK_IN1 and CLK_IN2. The timing adjustment for the odd or even-rows can be achieved by delaying the timing of the odd or even-rows CLK_IN1 and CLK_IN2. For example, referring to FIG. 2, delaying the timing of the scanning signal can be achieved by delaying the timing of the odd rows CLK_IN1 and CLK_IN2, increasing the charging time for the odd rows and improving the display uniformity.

The display device according to at least one embodiment of the present invention further comprises a display control circuit; the driving module comprises an odd-row driving circuit and an even-row driving circuit;

the timing controller is used for providing a first input clock signal, a second input clock signal, a third input clock signal, and a fourth input clock signal for the display control circuit;

the display control circuit is used for providing a first group of output clock signals to the odd-row driving circuit according to the first input clock signal and the second input clock signal, and is used for providing a second group of output clock signals to the even-row driving circuit according to the third input clock signal and the fourth input clock signal;

the odd-row driving circuit is used for generating a corresponding odd-row scanning signal according to the first group of output clock signals, and providing the odd-row scanning signal to an odd-row pixel circuit;

the even-row driving circuit is used for generating a corresponding even-row scanning signal based on the second set of output clock signals and provide the even-row scanning signal to an even-row pixel circuit.

The display device provided by the embodiments of the present invention can be any product or component having a display function such as a mobile phone, a tablet computer, a television, a display, a notebook computer, a digital photo frame, a navigator, etc.

While the foregoing is directed to the preferred embodiment of the present invention, it will be understood by those skilled in the art that various changes in form and details may be made therein without departing from the spirit and scope of the invention as defined by the appended claims.

What is claimed is:

1. A driving method applied to a display panel, the display panel comprising a plurality of rows of scanning lines, a plurality of columns of data lines, and a plurality of rows and a plurality of columns of pixel circuits, the pixel circuits being electrically connected to corresponding rows of scanning lines and corresponding columns of data lines; and the display panel comprises a first gate driving circuit and a second gate driving circuit, the first gate driving circuit and the second gate driving circuit share a pull-up node; the driving method comprises:

controlling a first charging time to be greater than 0.5 times a second charging time, and controlling the first charging time to be less than the second charging time;

wherein the first charging time is a time for charging an Ath-row Mth-column pixel circuit via an Ath data voltage on the Mth-column data line;

the second charging time is a time for charging the Bth-row Mth-column pixel circuit via the Ath data voltage and a Bth data voltage on the Mth-column data line;

A, B and M are positive integers; wherein B=A+1;

wherein the Ath-row Mth-column pixel circuit is electrically connected to an Ath-row scanning line, and the Bth-row Mth-column pixel circuit is electrically connected to the Bth-row scanning line; the Ath-row scanning line is used for providing an Ath-row scanning signal, and the Bth-row scanning line is used for providing a Bth-row scanning signal;

wherein the Ath data voltage is the same as the Bth data voltage; and wherein an effective pulse width of the Ath-row scanning signal is the same as an effective pulse width of the Bth-row scanning signal;

wherein a time for the Ath-row pixel circuit to be filled with the Ath data voltage is greater than 1H and less than 2H, and a time for the Bth-row pixel circuit to be filled with the Bth data voltage is 2H; wherein 1H time is a row pixel charging time, and 1H is related to a resolution and refresh frequency of the display panel.

2. The driving method according to claim 1, wherein the driving method comprises: controlling a time interval between a falling edge time of the Ath-row scanning signal and a falling edge time of the Bth-row scanning signal to be less than a half of the time for charging the Bth-row Mth-column pixel circuit via the Ath data voltage and the Bth data voltage.

3. The driving method according to claim 2, wherein the effective pulse width of the Ath-row scanning signal is greater than the effective pulse width of the Bth-row scanning signal.

4. The driving method according to claim 1, wherein in an Nth frame, the Ath-row Mth-column pixel circuit is an even-row pixel circuit, and the Bth-row Mth-column pixel circuit is an odd-row pixel circuit; N is an integer.

5. The driving method according to claim 1, wherein in an (N+1) th frame, the Ath-row Mth-column pixel circuit is an odd-row pixel circuit, and the Bth-row Mth-column pixel circuit is an even-row pixel circuit; N is a positive integer.

6. The driving method according to claim 1, wherein the Ath data voltage and the Bth data voltage are the same data voltage; the Ath-row Mth-column pixel circuit is electrically connected to an Ath-row scanning line, and the Bth-row Mth-column pixel circuit is electrically connected to a Bth-row scanning line; the Ath-row scanning line is used for providing an Ath-row scanning signal, and the Bth-row scanning line is used for providing a Bth-row scanning signal;

the driving method further comprises: controlling a first time to be greater than a second time;

the first time is a time interval between a time when the Mth-column data line starts to provide the Ath data voltage and a falling edge time of the Ath-row scanning signal;

the second time is a time interval between a falling edge time of the Ath-row scanning signal and a falling edge time of the Bth-row scanning signal.

7. The driving method according to claim 6, wherein the Ath-row Mth-column pixel circuit is electrically connected to the Ath-row scanning line, and the Bth-row Mth-column pixel circuit is electrically connected to the Bth-row scanning line;

the Ath-row scanning line is used for providing an Ath-row scanning signal, and the Bth-row scanning line is used for providing the Bth-row scanning signal;

an effective pulse width of the Ath-row scanning signal is not equal to an effective pulse width of the Bth-row scanning signal.

8. A display device, comprising a display panel, a timing controller, and a driving module;

the timing controller comprises a storage unit and a comparison unit;

the storage unit stores a specific picture;

the comparison unit is used for comparing a picture to be displayed with a specific picture, and when the picture to be displayed and the specific picture are the same or partially the same, providing an indication signal to the driving module;

the driving module is used for implementing the driving method as claimed in claim 1 when receiving the indication signal.

9. The display device according to claim 8, further comprising a display control circuit; the timing controller is used for providing a first input clock signal and a second input clock signal for the display control circuit;

the display control circuit is used for providing and outputting a plurality of output clock signals according to the first input clock signal and the second input clock signal;

the driving module is used for generating a corresponding scanning signal according to the output clock signal.

10. The display device according to claim 8, further comprising a display control circuit; the driving module comprises an odd-row driving circuit and an even-row driving circuit;

the timing controller is used for providing a first input clock signal, a second input clock signal, a third input clock signal, and a fourth input clock signal for the display control circuit;

the display control circuit is used for providing a first group of output clock signals to the odd-row driving circuit according to the first input clock signal and the second input clock signal, and is used for providing a second group of output clock signals to the even-row driving circuit according to the third input clock signal and the fourth input clock signal;

the odd-row driving circuit is used for generating a corresponding odd-row scanning signal according to the first group of output clock signals;

the even-row driving circuit is configured to generate a corresponding even-row scanning signal based on the second set of output clock signals.

11. A driving method applied to a display panel, the display panel comprising a plurality of rows of scanning lines, a plurality of columns of data lines, and a plurality of rows and a plurality of columns of pixel circuits, the pixel circuits being respectively electrically connected to corresponding rows of scanning lines and corresponding columns of data lines; and the display panel comprises a first gate driving circuit and a second gate driving circuit, the first gate driving circuit and the second gate driving circuit share a pull-up node; the driving method comprising:

when a fall time of an Ath-row scanning signal provided by an Ath-row scanning line is less than a fall time of a Bth-row scanning signal provided by a Bth-row scanning line, controlling a third time to be greater than a fourth time;

the third time is a time interval between a time when an Mth-column data line starts to provide an Ath data voltage to an Ath-row Mth-column pixel circuit and a time when the potential of the Ath-row scanning signal starts to decrease;

the fourth time is a time interval between a time when the Mth-column data line starts to provide a Bth data voltage to a Bth-row Mth-column pixel circuit and a time when the potential of the Bth-row scanning signal starts to decrease;

A, B and M being positive integers, and A is not equal to B; wherein B=A+1;

wherein a time for the Ath-row pixel circuit to be filled with the Ath data voltage is greater than 1H and less than 2H, and a time for the Bth-row pixel circuit to be filled with the Bth data voltage is 2H; wherein 1H time is a row pixel charging time, and 1H is related to a resolution and refresh frequency of the display panel.

12. The driving method according to claim 11, wherein the Ath data voltage is not equal to the Bth data voltage.

13. The driving method according to claim 11, wherein a time interval between the time when the potential of the Ath-row scanning signal starts to decrease and a time when the Mth-column data line stops providing the Ath data voltage is greater than a time interval between the time when the potential of the Bth-row scanning signal starts to decrease and the time when the Mth-column data line stops providing the Bth data voltage.

14. The driving method according to claim 11, wherein the driving method is applied to a display panel, and the first gate driving circuit and the second gate driving circuit both access a first clock signal end providing a first clock signal and a second clock signal end providing a second clock signal;

when the potential of the first clock signal jumps from a first level to a second level, the potential of the pull-up node is a first voltage value, and when the potential of the second clock signal jumps from the first level to the second level, the potential of the pull-up node is a second voltage value; the first voltage value is not equal to the second voltage value;

when the potential of the first clock signal jumps from a high level to a low level, the potential of the pull-up node becomes a third voltage value, and when the potential of the second clock signal jumps from a high level to a low level, the potential of the pull-up node is a fourth voltage value; the third voltage value is not equal to the fourth voltage value.

15. A driving method applied to a display panel, the display panel comprising a plurality of rows of scanning lines, a plurality of columns of data lines, and a plurality of rows and a plurality of columns of pixel circuits, the pixel circuits being respectively electrically connected to corresponding rows of scanning lines and corresponding columns of data lines; and the display panel comprises a first gate driving circuit and a second gate driving circuit, the first gate driving circuit and the second gate driving circuit share a pull-up node;

when an Ath data voltage provided by an Mth-column data line is different from a Bth data voltage provided by the Mth-column data line, controlling a time for charging a Bth-row Mth-column pixel circuit via the Bth data voltage to be greater than a charging time threshold;

A, B and M being positive integers, and A is not equal to B; wherein B=A+1;

wherein a time for the Ath-row pixel circuit to be filled with the Ath data voltage is greater than 1H and less than 2H, and a time for the Bth-row pixel circuit to be filled with the Bth data voltage is 2H; wherein 1H time is a row pixel charging time, and 1H is related to a resolution and refresh frequency of the display panel.

16. The driving method according to claim 15, wherein the charging time threshold is a one-row scanning time.

17. The driving method according to claim 15, wherein the Ath-row Mth-column pixel circuit is electrically connected to an Ath-row scanning line, and the Bth-row Mth-column pixel circuit is electrically connected to the Bth-row scanning line; the Ath-row scanning line is used for providing an Ath-row scanning signal, and the Bth-row scanning line is used for providing a Bth-row scanning signal;

an effective pulse width of the Ath-row scanning signal is less than an effective pulse width of the Bth-row scanning signal.

18. The driving method according to claim 17, wherein the step of controlling a time for charging a Bth-row Mth-column pixel circuit via the Bth data voltage to be greater than a charging time threshold, comprises:

increasing a time interval between a falling edge time of the Ath-row scanning signal and a falling edge time of the Bth-row scanning signal, so as to control the time for charging the Bth-row Mth-column pixel circuit via the Bth data voltage to be greater than a charging time threshold.

* * * * *